US 12,374,872 B2

(12) United States Patent
O'Connell et al.

(10) Patent No.: US 12,374,872 B2
(45) Date of Patent: Jul. 29, 2025

(54) ELECTRICALLY INSULATED BOOM MOUNTABLE TEMPORARY CONDUCTOR GUARD STRUCTURE

(71) Applicant: Quanta Associates, L.P., Houston, TX (US)

(72) Inventors: Daniel Neil O'Connell, Burnaby (CA); Raymond Henry Jodoin, Burnaby (CA); Benjamin James Harvey, La Grange, TX (US)

(73) Assignee: Quanta Associates, L.P., Houston, TX (US)

( * ) Notice: Subject to any disclaimer, the term of this patent is extended or adjusted under 35 U.S.C. 154(b) by 248 days.

(21) Appl. No.: 17/585,369

(22) Filed: Jan. 26, 2022

(65) Prior Publication Data

US 2022/0239076 A1 Jul. 28, 2022

Related U.S. Application Data

(60) Provisional application No. 63/142,124, filed on Jan. 27, 2021.

(30) Foreign Application Priority Data

Jan. 27, 2021 (CA) ...................................... 3107267

(51) Int. Cl.
*H02G 1/02* (2006.01)
*H02G 7/05* (2006.01)
(Continued)

(52) U.S. Cl.
CPC .................. *H02G 1/02* (2013.01); *H02G 7/05* (2013.01); *H02G 7/18* (2013.01); *H02G 1/04* (2013.01)

(58) Field of Classification Search
CPC .. H02G 1/02; H02G 1/04; H02G 7/00; H02G 7/05; H02G 7/053; H02G 1/16; B66F 11/044; B66F 11/046
(Continued)

(56) References Cited

U.S. PATENT DOCUMENTS 1,823,561 A * 9/1931 Card ........................ H02G 7/08
248/63
1,841,292 A * 1/1933 Lark ...................... H02G 7/053
24/135 L
(Continued)

FOREIGN PATENT DOCUMENTS

CN 110682327 A * 1/2020 .............. B25J 19/00

OTHER PUBLICATIONS

CN 110682327 A EspaceNet English Translation (Year: 2020).*
(Continued)

*Primary Examiner* — Makena S Markman
(74) *Attorney, Agent, or Firm* — Finnegan, Henderson, Farabow, Garrett & Dunner, LLP

(57) ABSTRACT

A temporary insulated conductor guard structure is mountable on an electrical insulator. The electrical insulator is mounted on the distal end of a crane or truck boom. The conductor guard structure includes a U-shaped frame having a horizontal elongate beam and a pair of stub arms upwardly extending from opposite ends of the beam. Elongate rigid, electrically conductive rollers are rotatably mounted to each of the stub arms and the beam so as to form an electrically conductive rolling surface extending around the interior of the U-shaped frame for rotationally supporting sagging electrical conductors thereon.

30 Claims, 21 Drawing Sheets

(51) Int. Cl.
*H02G 7/18* (2006.01)
*H02G 1/04* (2006.01)

(58) Field of Classification Search
USPC .................................................. 254/134.3 R
See application file for complete search history.

(56) References Cited

U.S. PATENT DOCUMENTS

| | | | | |
|---|---|---|---|---|
| 5,494,132 | A * | 2/1996 | Hansen | B61B 12/00 |
| | | | | 104/112 |
| 6,837,671 | B2 | 1/2005 | Devine et al. | |
| 8,226,069 | B2 | 7/2012 | Devine et al. | |
| 9,038,989 | B2 | 5/2015 | Devine et al. | |
| 2009/0095522 | A1* | 4/2009 | Barthold | H02G 1/04 |
| | | | | 174/40 TD |
| 2010/0133490 | A1* | 6/2010 | Devine | H02G 1/04 |
| | | | | 254/134.3 PA |
| 2011/0011987 | A1* | 1/2011 | Lessard | H02G 1/02 |
| | | | | 248/49 |
| 2012/0031646 | A1* | 2/2012 | Richardson, Jr. | H02G 7/125 |
| | | | | 174/146 |
| 2012/0175575 | A1* | 7/2012 | Devine | H02G 1/02 |
| | | | | 254/134.3 PA |
| 2012/0318611 | A1* | 12/2012 | Glenn, Jr. | H02G 1/02 |
| | | | | 182/36 |
| 2014/0097302 | A1* | 4/2014 | Musselman | H02G 1/02 |
| | | | | 248/49 |
| 2014/0174260 | A1* | 6/2014 | Davis | H01F 38/30 |
| | | | | 81/53.1 |
| 2015/0325985 | A1* | 11/2015 | O'Connell | H02G 1/02 |
| | | | | 254/134.3 R |
| 2015/0357802 | A1* | 12/2015 | Devine | B66C 23/68 |
| | | | | 294/81.6 |
| 2018/0242438 | A1* | 8/2018 | Lin | H05F 3/02 |
| 2019/0123525 | A1 | 4/2019 | O'Connell et al. | |
| 2021/0101277 | A1* | 4/2021 | Seekell | H02G 1/02 |
| 2021/0281052 | A1* | 9/2021 | Vaughn | H02G 1/02 |
| 2023/0022622 | A1* | 1/2023 | Salubro | H01B 17/06 |

OTHER PUBLICATIONS

Rodriquez, Kari, PCT Search Report for PCT/US22/14041, May 6, 2022, 2 pages, ISA/US, Commissioner for Patents, Alexandria, Virginia, United States.

Rodriquez, Kari, PCT Written Opinion of the International Searching Authority for PCT/US22/14041, May 6, 2022, 3 pages, ISA/US, Commissioner for Patents, Alexandria, Virginia, United States.

Diversified Products, 'Folding Guard Arm (LineWise)' available at https://line-wise.com/wp-content/uploads/2020/01/LineWise-Folding-Guard-Arm-Brochure.pdf, Jan. 2020, 1 page, Diversified Products, Waco, Texas, United States.

Tsimiklis, Francesca, Canada Examiner's Requisition regarding Canadian patent application No. 3,174,292, Jan. 30, 2024, 8 pages, CIPO, Canada.

Tsimiklis, Francesca, Canada Examiner's Requisition regarding Canadian patent application No. 3,107,267, Jan. 30, 2024, 8 pages, CIPO, Canada.

Hestroffer, Karine, Extended European Search Report regarding European patent application No. 227465838 (publication No. EP4282044), Jun. 13, 2024, 9 pages, EPO, Munich, Germany.

Pino Medel, Eduardo Antonio, Notification resolution of expert's response (new law) regarding Chile patent application No. 202302224, Sep. 23, 2024, 13 pages, Santiago, Chile.

* cited by examiner

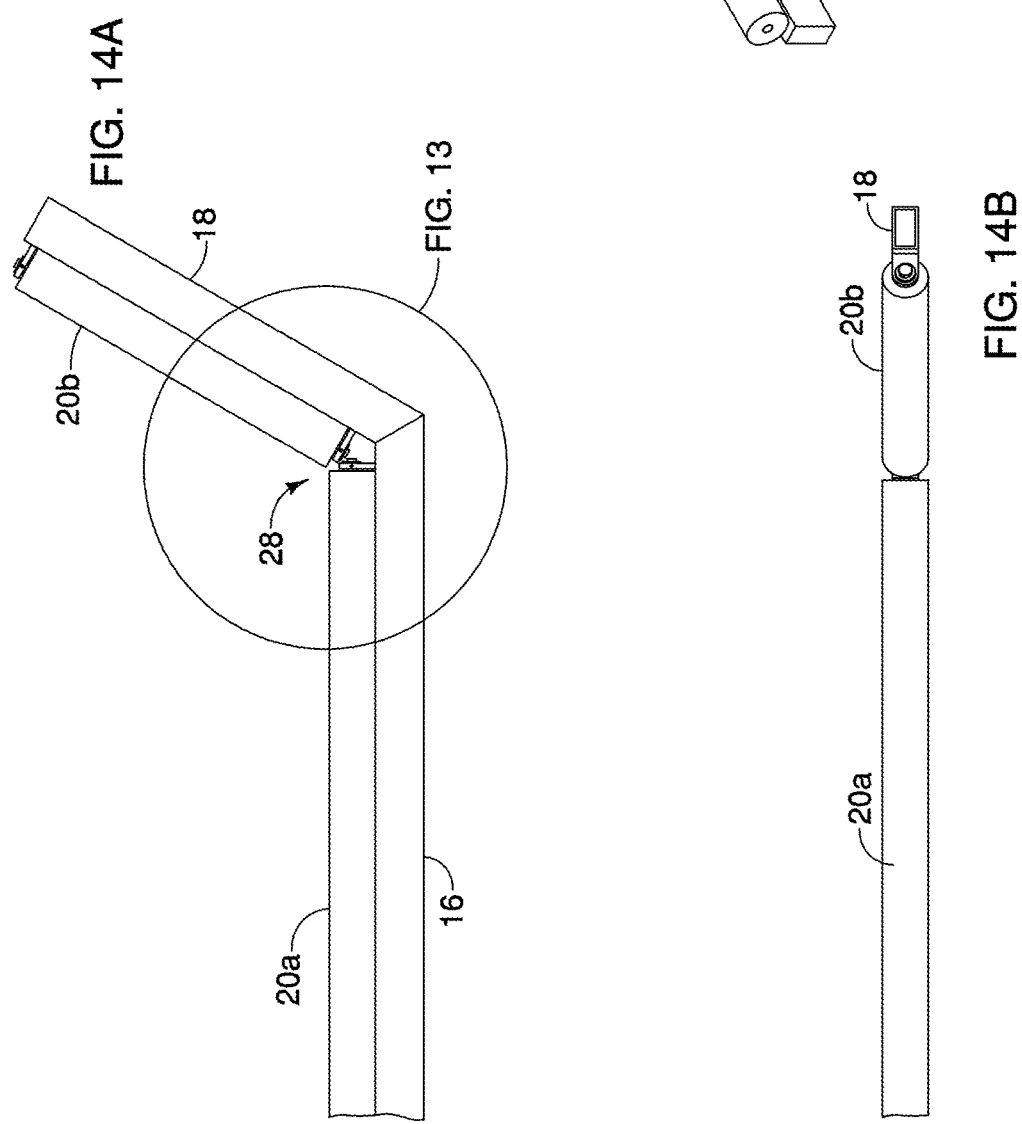

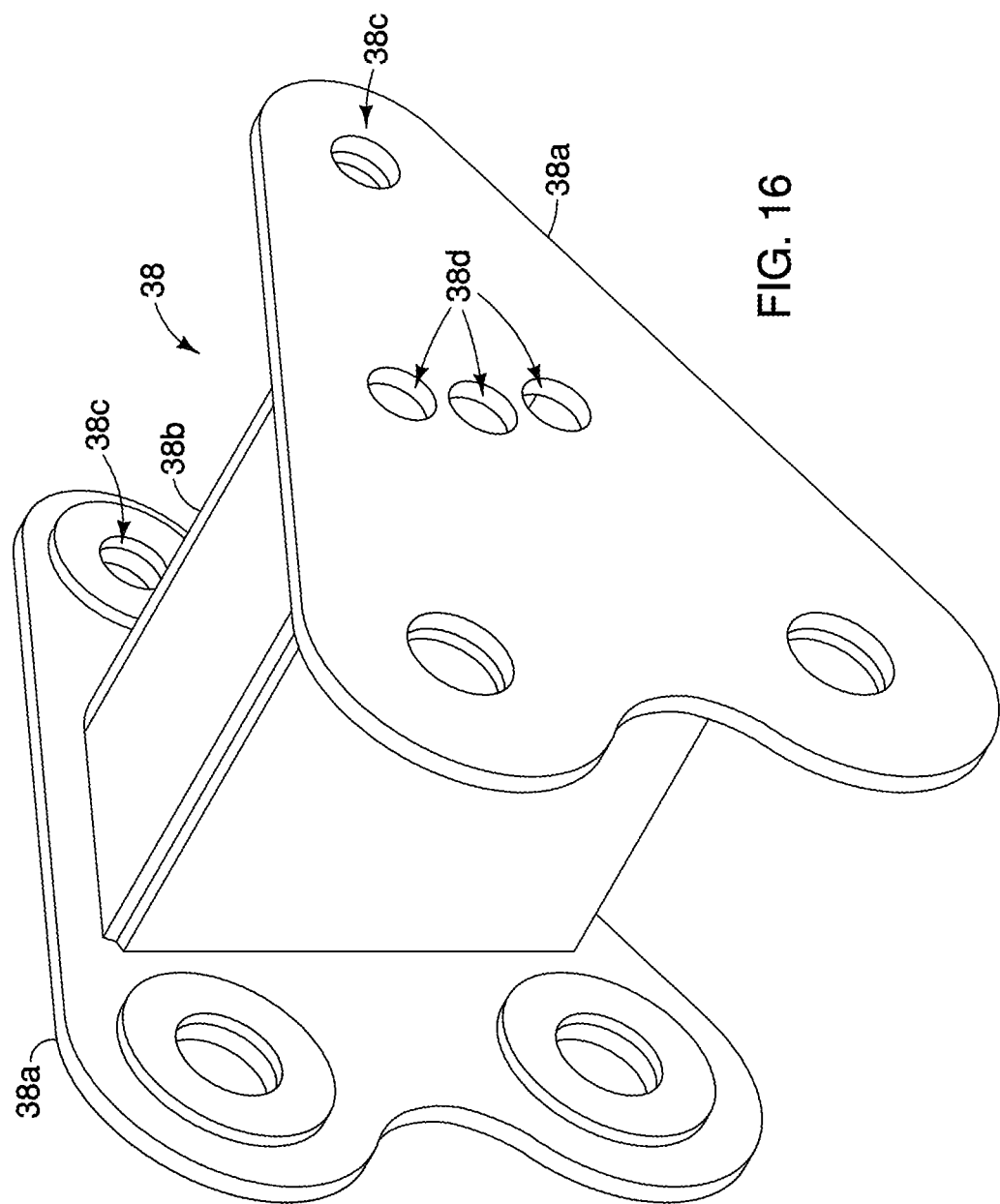

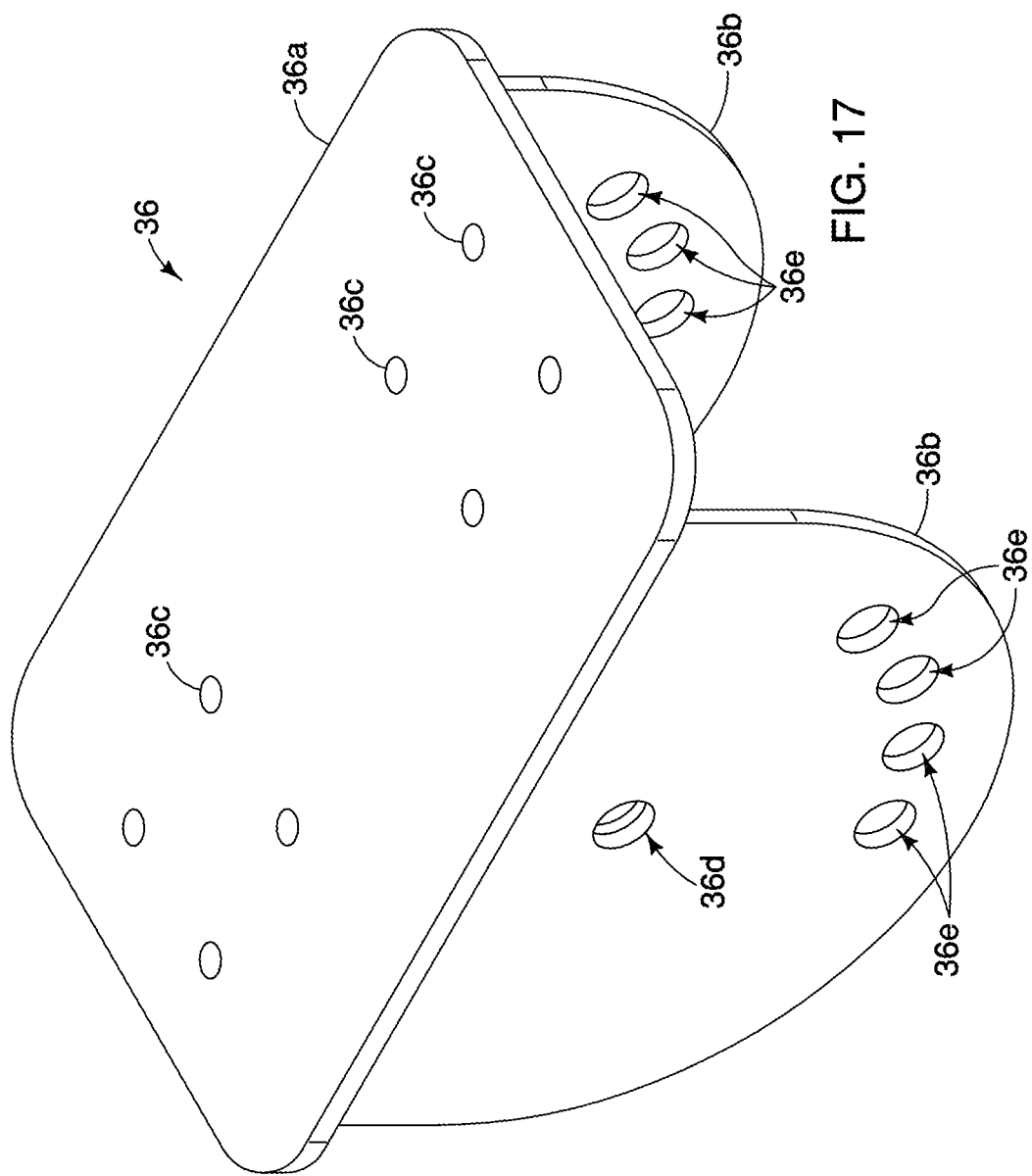

ELECTRICALLY INSULATED BOOM MOUNTABLE TEMPORARY CONDUCTOR GUARD STRUCTURE

TECHNICAL FIELD

The present disclosure relates to an electrically insulated, boom mountable temporary conductor guard structure for keeping sagging conductors from contacting anything below the conductors, such as personnel, vehicles, the ground, roads, other electrical circuits as they are strung between support structures, and to increase safety to personnel and equipment by electrically insulating or isolating the boom mountable temporary conductor guard structure.

BACKGROUND

High voltage transmission and distribution lines or circuits are typically strung between a series of spaced apart support structures which could be poles or towers. Other lines which are also strung between support structures include overhead shield, or static/ground wires and overhead fiber optic cables or optical ground wires (OPGW). In an energized environment, all of these lines are treated as being energized during reconductoring and re-stringing, and thus all of these lines are collectively referred to herein as conductors throughout the present disclosure.

The process of stringing conductors requires safeguards to protect personnel, vehicles, roads, railroads, paths, existing circuits, telephone, cable crossings, as well as existing infrastructure from conductors sagging down while stringing is in progress. Temporary guard structures are often used to provide such protection between the support structures at these areas or crossings. Temporary guard structures may be in the form of two or three vertical poles with a horizontal member between each pole, as illustrated in FIG. 1A, generally used when stringing transmission conductors on an H-frame or similar support structure.

Alternatively, temporary guard structures can comprise a single pole with crossarms as illustrated in FIG. 1B, generally used when stringing conductors on single pole support structures, usually in cases of lower voltage transmission or distribution circuits.

Often, onsite construction or erection of guard structures proves physically difficult or impractical due to location. In such cases, a crane or boom truck with a stringing traveler suspended from the winch line or a temporary support mounted to the end of the boom is employed. The stringing traveler holds the conductor being strung up in position not allowing it to sag below the stringing traveler. FIG. 1C illustrates an example of stringing travelers suspended from a crane or boom truck winch line, which are also used to protect roadways and distribution circuits below the stringing of a transmission line. The disadvantage of such arrangements is the stringing traveler tends to swing back and forth with the conductor in movement.

A boom mounted temporary conductor guard structure can also be used to catch and support the moving conductor if the tension in the conductor drops during stringing, preventing the conductor from contacting the ground or the existing infrastructure below the conductors being strung.

Stringing of a conductor that occurs in proximity or adjacent to energized lines requires treating the conductor being strung as energized due to the risk of induced voltage and current (induction). Induction in conductors in an energized zone can be significant and dangerous, if not fatal. In many cases, the voltage has been measured to be over 20,000 volts.

A failure in any of the payout tensioning equipment or breakage of the conductor, pulling line, or the like can result in the conductor losing the horizontal tension and sagging or falling to the ground. Typical guard structures and crane or boom truck mounted conductor guard structures protect objects and the area below from the electrical, physical, or mechanical dangers of the falling or sagging conductors. However, conductors can also become energized if they fall or contact under-built or electrical circuits below. This in turn can energize conductor guard structures or boom mounted conductor guard structures exposing personnel and equipment to dangerous voltage and current.

When stringing conductors in energized zones or if the conductor being strung contacts an energized circuit below, this may expose personnel and equipment to dangerous voltage and current. This danger can be fatal to personnel and damaging to equipment.

In the prior art applicant owns U.S. Pat. No. 9,038,989, entitled "Boom Mountable Robotic Arm" which teaches a boom mounted robotic arm for temporarily supporting conductors with a beam adapted for mounting onto the upper end of the boom and at least one electrically insulated support post mounted to the beam, where each post temporarily supports a conductor.

It is desirable that crane or boom truck mounted structures be at least somewhat collapsible, stowable, or removable for transportation.

SUMMARY

An electrically insulated boom-mountable temporary conductor guard structure is provided that is adapted to mount onto a distal end of a crane or truck boom. In one embodiment the electrically insulated boom mountable temporary conductor guard structure is mounted on the end of a crane or truck boom. The electrically insulated boom mountable temporary conductor guard structure includes a rigid U-shaped frame, wherein the U-shape is comprised of an elongate horizontal beam, generally horizontal when in an operative position, having a pair of upstanding stub arms, preferably of substantially equal length, extending upwardly and outwardly from the opposite ends of the horizontal beam. In one embodiment the length of the beam may be at least twice as long as the length of each of the stub arms so that the frame, when in use, is adapted to have a long laterally extending spread to catch and support sagging or dropped conductors which extend in a longitudinal direction perpendicular to the orientation of the beam. By way of example, the beam length may be six feet, or eight feet, or twelve feet long. An included angle between the stub arms and the elongate beam is in one embodiment at least 90 degrees, and in other embodiments may preferably be in the range of approximately 100 140 degrees.

Elongate, rigid, electrically conductive rollers are rotatably mounted to each of the stub arms and to the horizontal beam so as to form a continuous or substantially continuous rolling surface along the entire length of the inside or interior perimeter of the U-shaped frame for rotationally supporting the conductors supported thereon. The stub arms and their rollers lie in a first plane, and in one embodiment are offset and alongside so as to overlap the ends of the horizontal beam and its corresponding roller so that the first plane is adjacent and parallel to a second plane containing the horizontal beam and its roller. In a further embodiment, the rollers on the stub arms are in-line with the roller on the horizontal beam so that all three rollers and the U-shaped frame lie in a common plane.

The frame mounts onto the upper end of a substantially vertically disposed electrical insulator or plurality of electrical insulators. The lower end of the insulators mount onto the free end of the crane or truck boom, for example onto an adjustable base mounted onto the free end of the boom by a boom adaptor.

In a preferred embodiment the frame is mounted on a swivel plate mid-way along the underside of the beam. In on embodiment the swivel plate enables the horizontal beam to be rotated so that it is perpendicular to the conductors being strung. In another embodiment the swivel also allows the frame to be rotated and folded down onto the insulators for transport. The swivel plate is parallel to the frame's beam so that a first plane in which the swivel plate lies is parallel to a second plane containing the beam.

In a further preferred embodiment the frame is mounted in a support bracket or channel, collectively referred to as a mounting bracket, mounted on the swivel plate, and may be disconnected and removed from the swivel plate by removing bracket pins from the support bracket or channel, or may be mounted on the swivel by other quick-connect systems so that the frame can be removed. Once removed, the frame may be stored for transport rather than folded down along the insulators, and the frame may be removed and a frame of different length substituted. Removing the frame from the swivel plate allows for frames having different length beams to be used based on, for example, lateral support length requirements and configuration of the circuits being strung. Removing the frame from the swivel plate further allows for swapping out the frame and substituting other accessories such as a stringing traveller mounted on a support so as to be directly above and adjacent to the swivel plate.

A method is further provided for temporarily protecting a conductor as it is strung between one or more support structures. The method comprises the steps of:
  a. mounting the above described frame of an electrically insulated boom mountable temporary conductor guard structure on top of electrical insulators, and positioning the electrically insulated boom mountable temporary conductor guard structure below the location of a conductor to be, or being, strung;
  b. rotating the frame on the swivel as necessary so that the frame is perpendicular to the conductor;
  c. as necessary, supporting a sagging or dropped conductor on the rigid, electrically conductive rollers on the frame as the conductor is strung so as to electrically insulate the sagging or dropped conductor from at least the crane or truck boom and the ground or personnel.

A method is also provided of deploying and stowing the fold-for-storage embodiment of the electrically insulated boom mountable temporary conductor guard structure described above between its elevated in-use position and its storage and transport position on the crane or boom truck. The method includes the steps of:
  a. with the electrically insulated boom mountable temporary conductor guard structure in its elevated in-use position, stowing the electrically insulated boom mountable temporary conductor guard structure by lowering the boom to lower the electrically insulated boom mountable temporary conductor guard structure until it is adjacent the crane or truck boom;
  b. pivoting the U-shaped frame and the swivel plate on which the frame is mounted to align the surface of swivel plate opposite the frame flush along the insulators; and
  c. rotating the frame on its swivel plate until the beam of the frame is parallel to the longitudinal axis of the insulators.

It is to be understood that other aspects of the present disclosure will become readily apparent to those skilled in the art from the following detailed description, wherein various embodiments of the disclosure are shown and described by way of illustration. As will be realized, the disclosure is capable of other and different embodiments and its several details are capable of modification in various other respects, all without departing from the spirit and scope of the present disclosure. Accordingly, the drawings and detailed description are to be regarded as illustrative in nature and not as restrictive.

BRIEF DESCRIPTION OF THE DRAWINGS

A further, detailed, description of the disclosure, briefly described above, will follow by reference to the following drawings of specific embodiments of the disclosure. The drawings depict only typical embodiments of the disclosure and are therefore not to be considered limiting of its scope. In the drawings:

FIG. 14 is, in perspective view, a partially cutaway end portion of one end of the U-shaped frame and rollers of a further embodiment of the electrically insulated boom mountable temporary conductor guard structure wherein the electrically conductive rollers are mounted in-line on both ends of the U-shaped frame.

FIG. 14A is, in elevation view, the embodiment of FIG. 14.

FIG. 14B is, in plan view, the embodiment of FIG. 14.

FIG. 16 is, in perspective view, the adapter base of FIG. 15.

FIG. 17 is, in perspective view, the insulator adapter of FIG. 15.

The drawings are not necessarily to scale and in some instances, proportions may have been exaggerated in order to more clearly depict certain features.

DETAILED DESCRIPTION

The description that follows and the embodiments described therein are provided by way of illustration of examples of particular embodiments of the principles of various aspects of the present disclosure. These examples are provided for the purposes of explanation, and not of limitation, of those principles and of the disclosure in its various aspects.

Figure 1A:
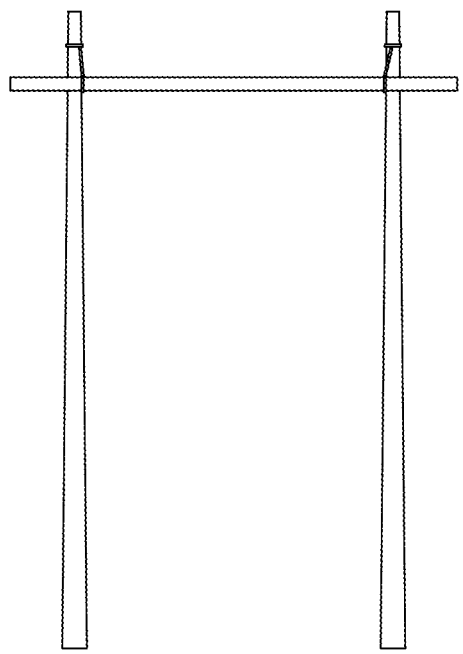
FIG. 1A and FIG. 1B are elevation views of prior art temporary guard structures.
Figure 1B:
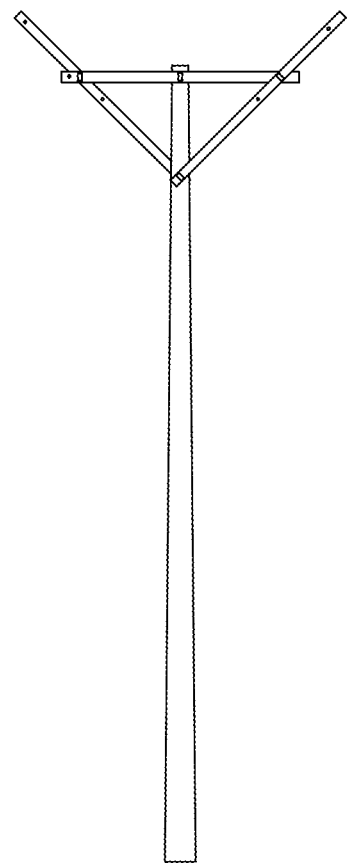

Prior art conductor guard structures are illustrated in FIG. 1A and FIG. 1B wherein sagging conductors are caught and supported on rigid horizontal elevated members. Prior art stringing travellers suspended from a winch line while elevated and supported on a crane or truck boom are seen illustrated in FIG. 1C.

The present disclosure relates to embodiments by way of example of improved conductor guard structures and in particular to electrically insulated boom mountable temporary conductor guard structures for catching and supporting sagging or dropped conductors during stringing operations. The structure is referred to herein as a conductor guard structure or conductor guard. As seen in FIG. 2 and FIG. 3, the electrically insulated boom mountable temporary conductor guard structure is mountable to a crane- or truck boom so that, with the conductor guard structure elevated on the end of the crane or truck boom and with the conductor guard structure in its operative position and orientation as better described below, the conductor guard structure provides support to one or more sagging conductors as they are being strung onto and between support structures such as poles or towers. The electrically insulated boom mountable temporary conductor guard structure also provides for support to a dropped conductor, for example which fails or otherwise loses its tension and falls between its support structures.

As better seen in FIG. 2, the electrically insulated boom mountable temporary conductor guard structure includes a rigid somewhat U-shaped frame, wherein the U-shaped frame is comprised of an elongate horizontal beam having uprights at its ends. The horizontal beam, when in its operative position, is substantially horizontal and square or perpendicular to the conductor under which the conductor guard structure is positioned. The pair of uprights at the ends of the horizontal beam are preferably of substantially equal lengths, and preferably angled upwardly and outwardly relative to the ends of the horizontal beam. The uprights may be stub arms such as illustrated. The uprights are, with out intending to be limiting, collectively referred to herein as stub arms extending upwardly and outwardly from the ends of the horizontal beam. Advantageously the pair of stub arms lie in a common plane, preferably vertical, containing only the stub arms or containing the stub arms and the horizontal beam. In the illustrated embodiment of FIG. 2A to FIG. 12, only the stub arms are contained in the common plane. In that embodiment the common plane containing the pair of stub arms is adjacent to a vertical plane containing the horizontal beam. In the embodiment of FIG. 13, the pair of stub arms and horizontal beam lie in the same plane.

The length of the horizontal beam may be at least twice as long, and advantageously longer, than the length of each of the stub arms so that, collectively, the frame, when in use, is adapted to have a long lateral spread to catch and support longitudinally extending sagging conductors. For example, and without intending to be limiting, the horizontal beam may be six, eight or twelve feet long.

Elongate, rigid, electrically conductive rollers are rotatably mounted to each of the stub arms and to the horizontal beam so as to form a continuous electrically conductive rolling surface along the inside perimeter of the U-shape of the frame for rotationally supporting the sagging or dropped conductors supported thereon. Thus as the conductors supported on the rollers moves longitudinally relative to the U-shaped frame, the rollers rotate so as to maintain contact with the conductor or conductors without the conductors longitudinally sliding over the rollers. The rollers are advantageously tubular, electrically conductive, and may be metallic, for example made of aluminum, or externally coated in aluminum.

Figure 15A:
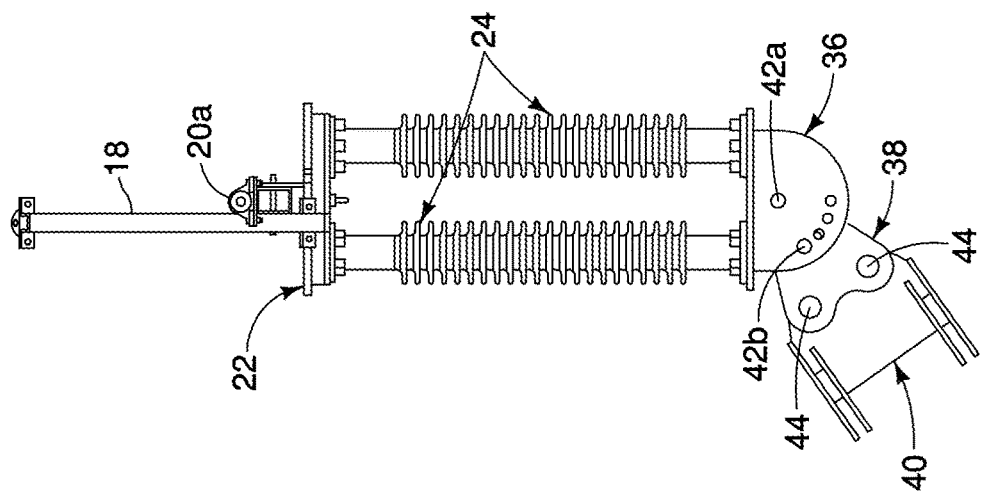
FIG. 15A is, in elevation view, the embodiment of FIG. 15.
Figure 15:
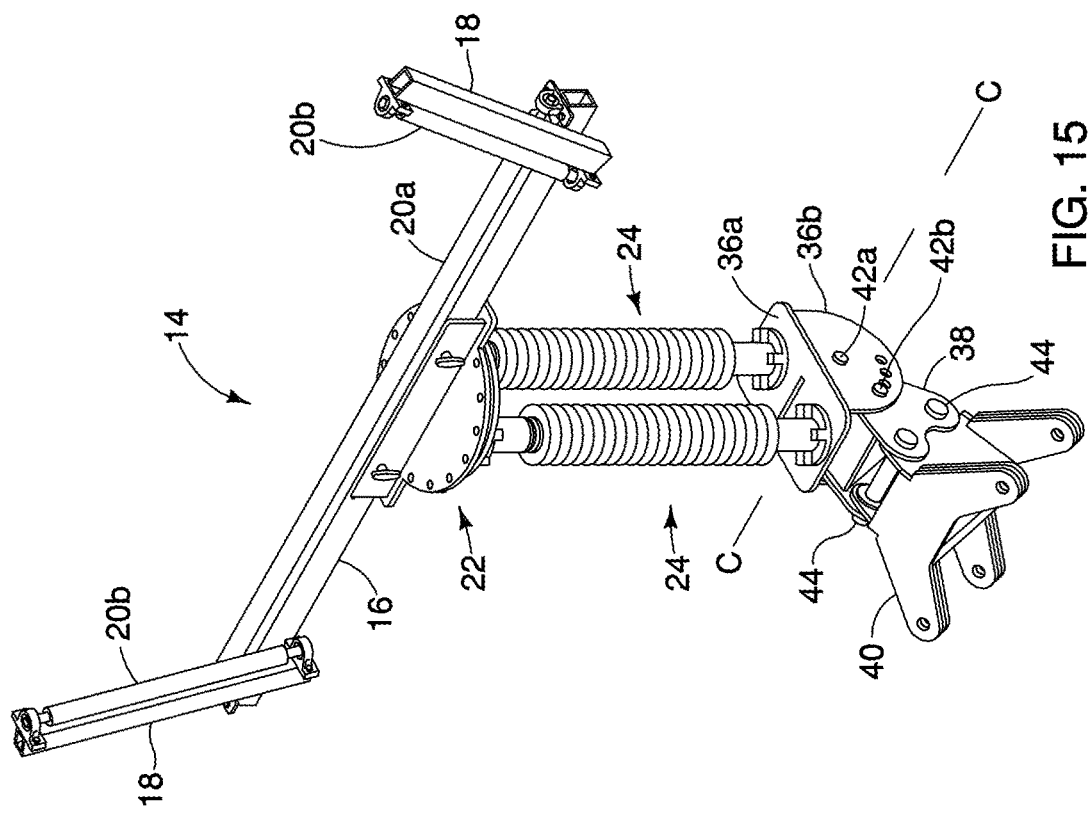
FIG. 15 is, in perspective view, a further embodiment having a non-hydraulic angularly adjustable adapter for mounting the electrically insulated boom mountable temporary conductor guard structure and insulators onto the end of a crane or truck boom.

The U-shaped frame mounts onto the upper end of a generally vertically disposed electrical insulator or plurality of electrical insulators such as the pair of insulators illustrated. The lower end of the insulators mount onto the free end of the crane or truck boom, for example onto a base, such as illustrated, mounted onto the free end of the crane or truck boom by a boom adaptor. The base may be pivotally mounted onto the boom adaptor and have a selectively actuable actuator, such as the hydraulic cylinder illustrated, cooperating between the base and boom adaptor for selectively adjusting the angle of the vertical insulators relative to vertical or relative to the boom. Alternatively, the insulators can be mounted to an insulator adapter connected to an adapter base and adjusted by lining up holes to maintain the insulators in vertical position and inserting the locking pin as shown in FIG. 15 and FIG. 15A.

Figure 2B:
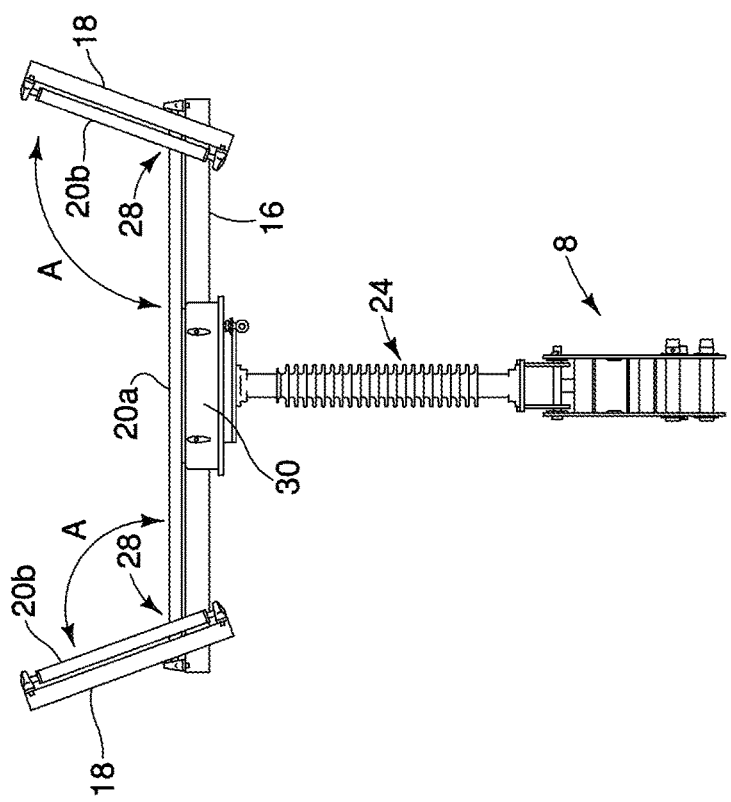
FIG. 2B is, in front elevation view, the first embodiment of FIG. 2A.
Figure 2A:
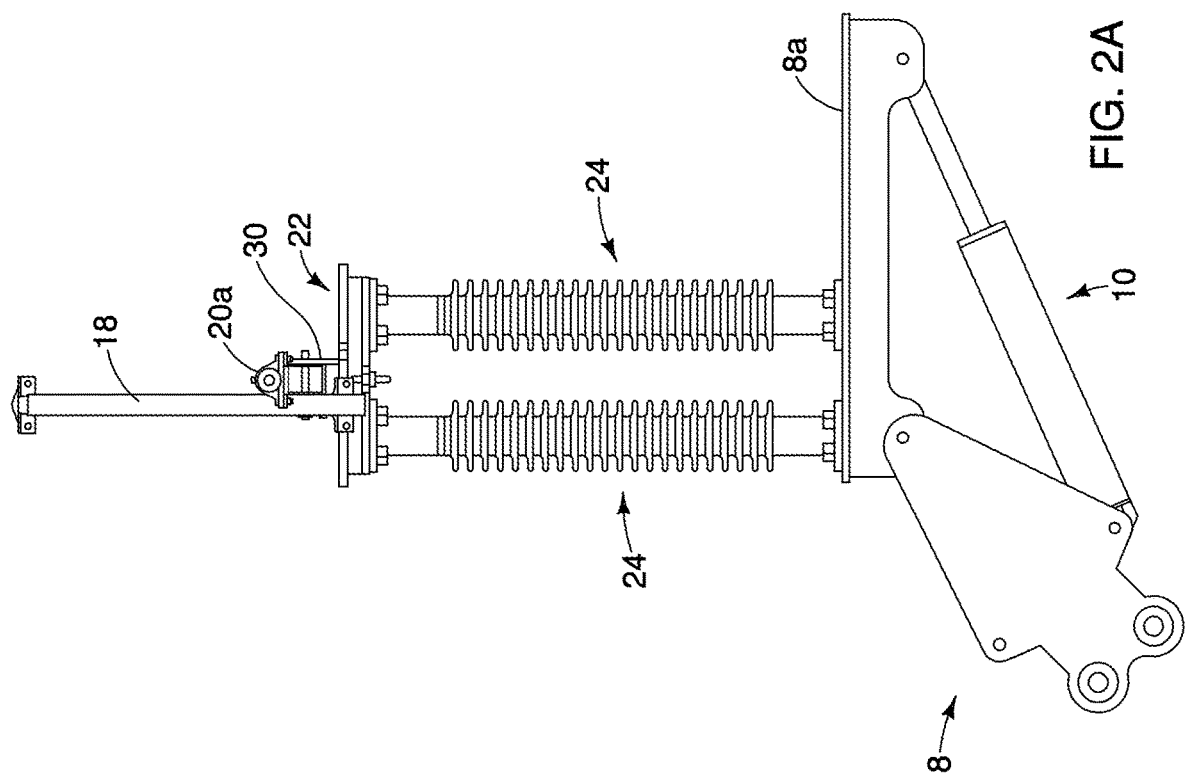
FIG. 2A is, in side elevation view, enlarged from FIG. 3, a first embodiment of an electrically insulated boom mountable temporary conductor guard structure wherein the conductor guard structure frame is removable from the swivel plate for storage.
Figure 2C:
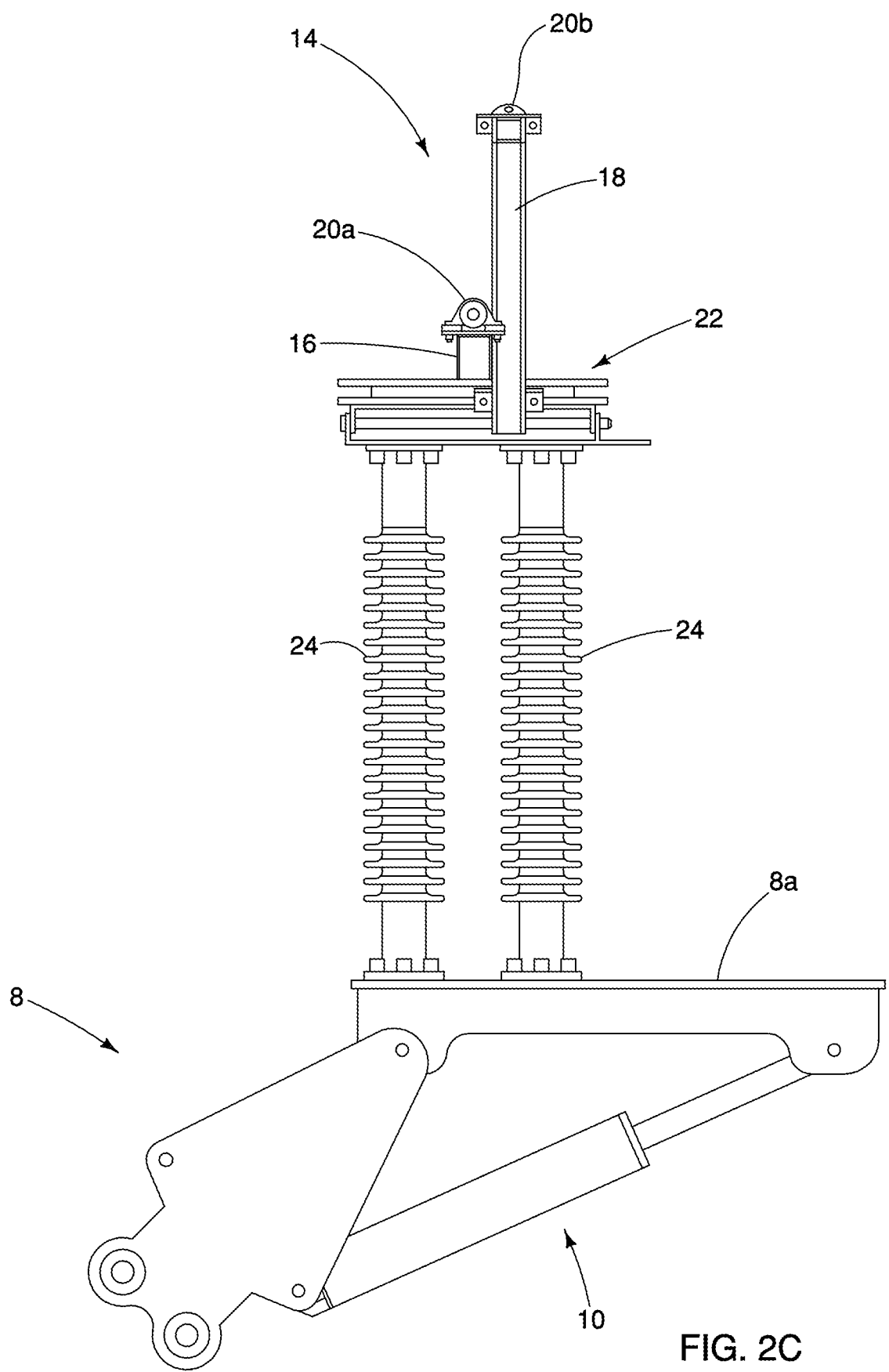
FIG. 2C is, in side elevation view, a second embodiment of an electrically insulated boom mountable temporary conductor guard structure wherein the guard structure is mounted to the swivel plate.
Figure 2D:
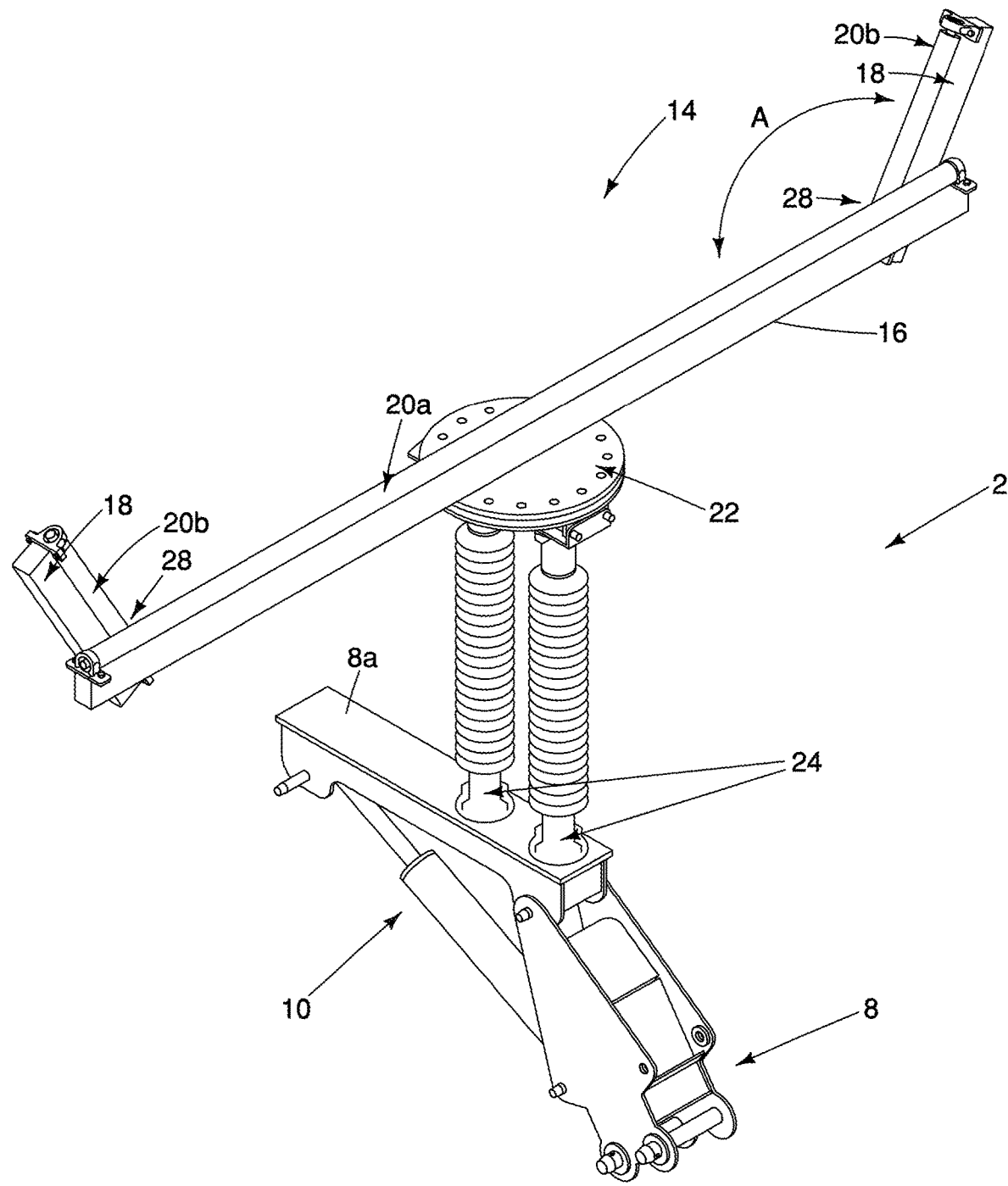
FIG. 2D is, in rear perspective view, the second embodiment of FIG. 2C.
Figure 3:
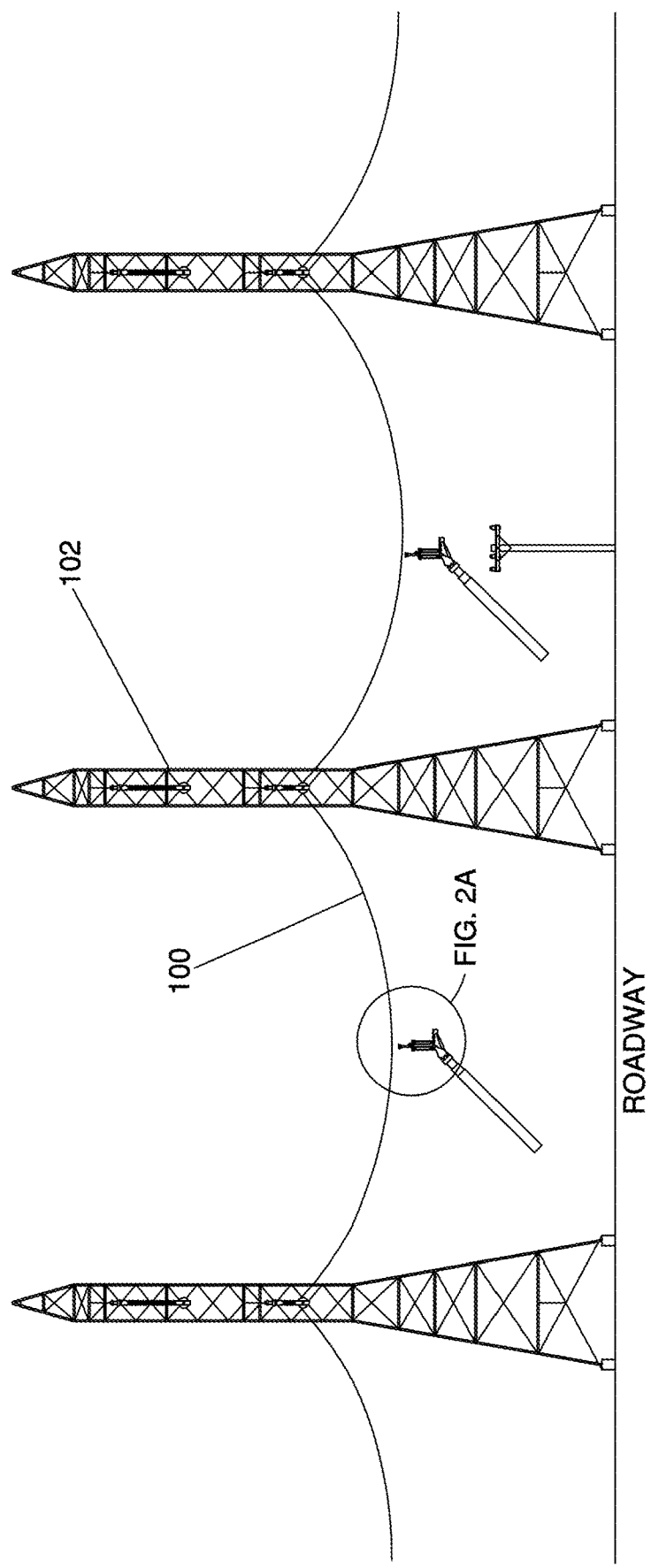
FIG. 3 is an elevation view of a stringing arrangement including the electrically insulated boom mountable temporary conductor guard structure of FIG. 2A.

An example of the electrically insulated boom mountable temporary conductor guard structure of FIG. 2A in use is seen in FIG. 3. Thus a roadway running under the conductor or conductors under which the conductor guard structure is positioned is protected from contact with the conductors if they sag or drop.

Figure 4:
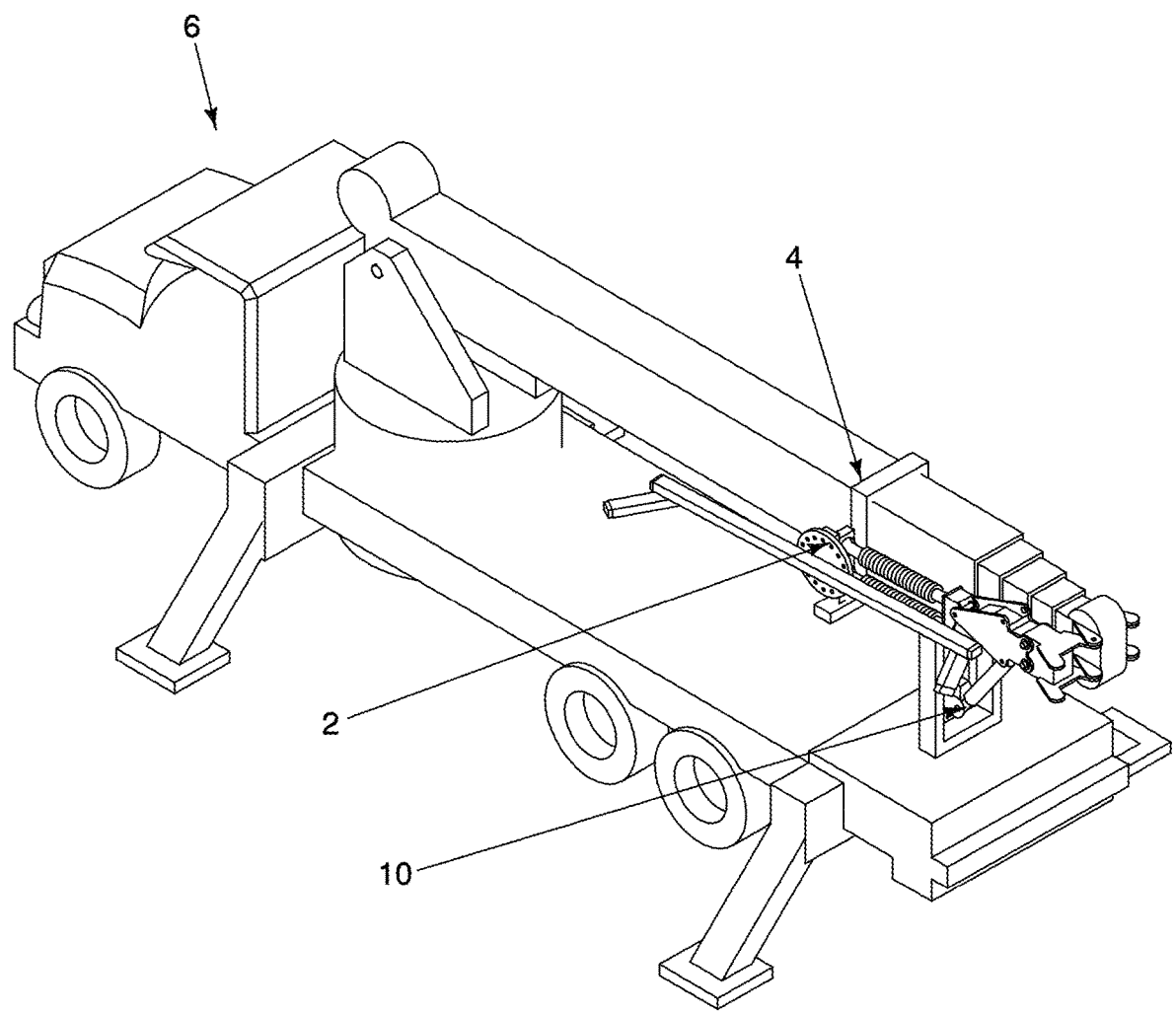
FIG. 4 perspective view of the electrically insulated boom mountable temporary conductor guard structure of FIG. 2C in a storage and transport position mounted on a crane or truck boom.
Figure 5:
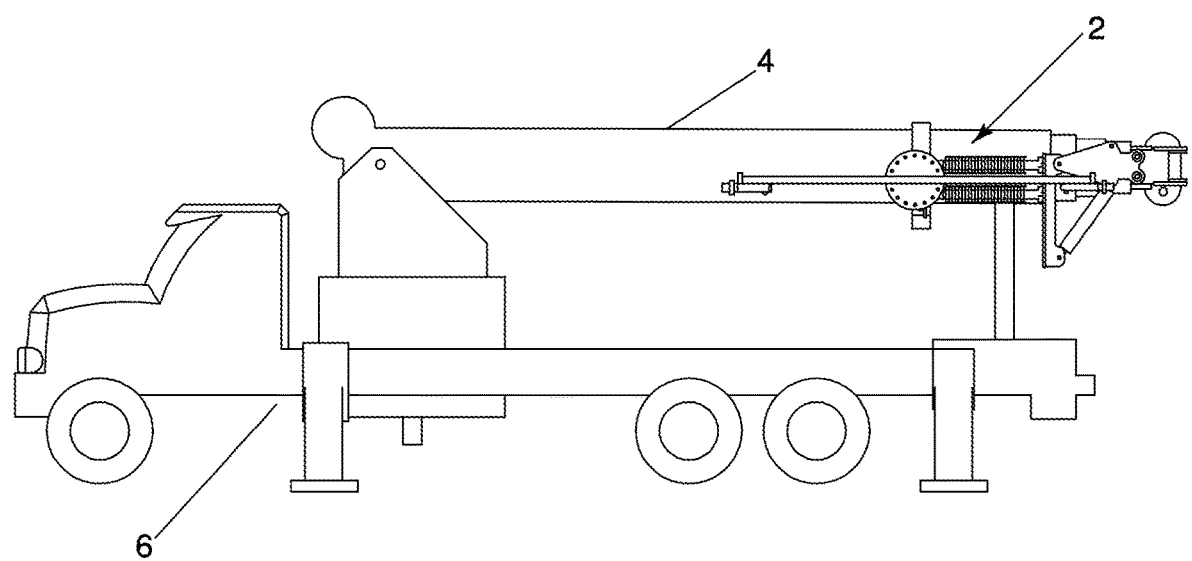
FIG. 5 is a side elevation view of FIG. 4.
Figure 6:
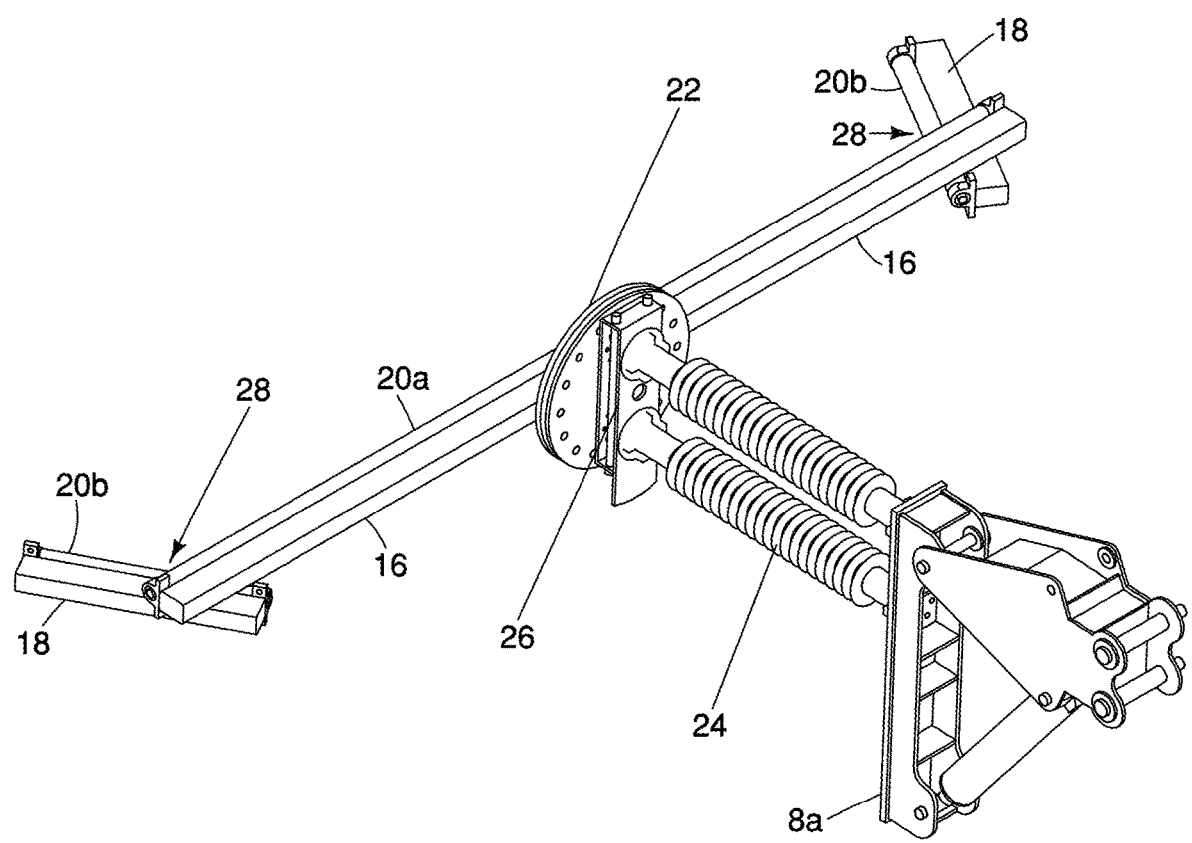
FIG. 6 is a bottom perspective view of the electrically insulated boom mountable temporary conductor guard structure of FIG. 2C.

As seen in FIG. 4 and FIG. 5, the electrically insulated boom mountable temporary conductor guard structure 2 is mountable to a crane or truck boom 4 of a crane or boom truck 6 so as to, in one embodiment, be folded down alongside the insulators for storage during travel of the truck. In a preferred embodiment of a system incorporating electrically insulated boom mountable temporary conductor guard structure 2, the conductor guard structure 2 is mounted to base 8, which in turn is mounted on the crane or truck boom 4. Examples of a suitable base 8 can be seen in Applicant's U.S. Pat. No. 6,837,671, incorporated herein by reference, although other forms of the base or like structures will work as would be known by one skilled in the art. Base 8 may include an elongate platform 8a having a leveling mechanism 10, such as the hydraulic cylinder actuator illustrated, pivotally mounted on the upper end of a boom adaptor, to selectively orient the platform 8a to the horizontal in order to position the pair of insulators 24 vertically so as to best support heavy loading in compression. Other levelling mechanisms 10 can include, without intending to be limiting, a scissor linkage such as seen in Applicant's U.S. Pat. No. 8,226,069, also incorporated herein by reference, or an adjustable non-hydraulic adapter as shown in FIG. 15 and FIG. 15A.

In the embodiments of FIG. 2A to FIG. 2D, U-shaped support frame 14 includes elongate horizontal beam 16 and a pair of, upstanding and outwardly extending stub arms 18 mounted at either end thereof and off-set therefrom so as to be alongside beam 16, for catching and supporting the conductors 100 if they drop or as they sag down for example while they are being strung. The length of the stub arms 18 and their included angle (angle A as illustrated) relative to the beam 16 can vary depending on nature of the stringing operation. Stub arms 18 may extend laterally outwardly from the ends of beam 16, or may be vertically oriented.

Although various lengths of beam 16 may be employed, applicant has found that it is advantageous for the beam to be long enough to ensure that a conductor being strung is supported in the event of dropping or excessive sagging of the conductor when the conductor guard structure 2 is positioned below the conductor being strung. For example, and without intending to be limiting, the length of the beam 16 may be from four to fourteen feet, and in some instances preferably six, eight or twelve feet long.

As illustrated, in one embodiment not intended to be limiting, stub arms 18 may be approximately 36 inches or less in length. Stub arms 18 may be rigidly or removably affixed to the ends of beam 16 so as to extend for example vertically upward, or for example so as to extend by approximately zero to 30 degrees off vertical, outwardly oriented relative to one another to extend the lateral reach of the conductor support. The role of the stub arms 18 is to guide and maintain the conductors 100 such as seen in FIG. 3 within the U-shaped frame 14. Thus the stub arms 18 may be longer or shorter than depicted, and inclined at greater or lesser angular inclinations and not affect the use of the stub arms 18 to assist in the capture of conductors 100 and the maintenance of the conductors 100 within frame 14.

In a further alternative embodiment, the two included angles A between the pair of stub arms 18 and the elongate beam 16 are each selectively adjustable at the intersections or elbows 28 between the stub arms 18 and the beam 16 by for example pivoting, hinged, bolted or pinned connections (not shown) or other rotatable connection having a locking mechanism to maintain the desired angular orientation between the stub arms 18 and the elongate beam 16. Further optionally, the length of the stub arms 18 can be adjusted by the provision of telescoping stub arms 18 (not shown) or modular stub arms 18 (not shown) that can be connected to one another lengthwise to achieve a desired length.

The elongate beam 16 and each of the stub arms 18 rotatably support corresponding elongate rollers 20a and 20b respectively along their lengths. The three rollers; roller 20a along beam 16 and rollers 20b along the stub arms 18, extend adjacent and parallel to beam 16, and to the two stub arms 18 respectively so as to form a continuous or substantially continuous electrically conductive roller surface around the inside perimeter of the U-shaped frame 14. The inside perimeter extends along and has a length illustrated by way of example in FIG. 9. The ends of rollers 20a and 20b may be mounted in bearings such as illustrated in the embodiment of FIG. 2A so that the rollers roll about their axes of rotation with movement of the conductor 100 being pulled over the rollers as the conductor 100 is strung between support structures 102. Rollers 20a and 20b reduce damage and wear on the conductor as the conductor 100 travels over the U-shaped frame 14.

The rollers 20a and 20b are electrically conductive, in contrast to rollers found in the prior art having surfaces of rubber or metal impregnated rubber material, as applicant has found that such prior art rollers tend to heat up and may burn or melt due to charging current when supporting an energized conductor. The rollers according to the present disclosure are rigid and are made from electrically conductive material such as metals including aluminum or steel, or from conductive composites such as Kevlar™ having metal threading woven or otherwise embedded into it. The electrically conductive rollers 20a and 20b serve to conduct charging current flowing to the U-shaped frame 14. Applicant has found that this significantly reduces or eliminates the buzzing and burning that applicant has observed tends to occur when dielectric rollers are used.

In embodiments where the angle of the stub arms 18 is adjustable relative to the elongate beam 16, the rollers 20b of each stub arm 18, because they are mounted on their respective stub arms 18, move simultaneously with the angular adjustment of their respective stub arms 18 to selectively adjust included angle A.

In embodiments where the length of the stub arms 18 is adjustable by means of telescoping or modular design (not shown), then the rollers 20b associated with each stub arm 18 are also advantageously either telescopic or part of each modular stub arm 18.

Alternatively, as illustrated in FIG. 2A, the lower ends of rollers 20b may be offset from and overlap with the ends of roller 20a to prevent any gaps between the ends of the rollers at intersections 28. These arrangements ensure that the conductor 100 is always supported on the rollers 20a and 20b and is prevented from falling in between the ends of rollers 20a and 20b, which would possibly damage the conductor and/or the frame.

The elongate beam 16 of the U-shaped support frame 14 may preferably be mounted to or on a rotatable swivel 22 which swivels to allow the opening of the U-shaped frame 14, which extends between stub arms 18 along the length of beam 16, to be oriented to be perpendicular relative to the conductors so as to squarely face, receive and support the conductors 100 when the conductor guard structure 2 is required and positioned for use. The U-shaped frame 14 is selectively rotatable on the swivel so as to be perpendicular to the conductor 100, to provide the best protection in case a conductor sags or drops, and so that the crane or boom truck may be parked in a convenient location and position relative to the conductor 100 so long as the boom can be positioned under the conductor.

In a fold-away-for-storage embodiment such as seen in FIG. 4, swivel 22 optionally also rotates to position the conductor guard structure 2 in a more compact orientation for storage and transport when the boom 4 is lowered.

Figure 10:
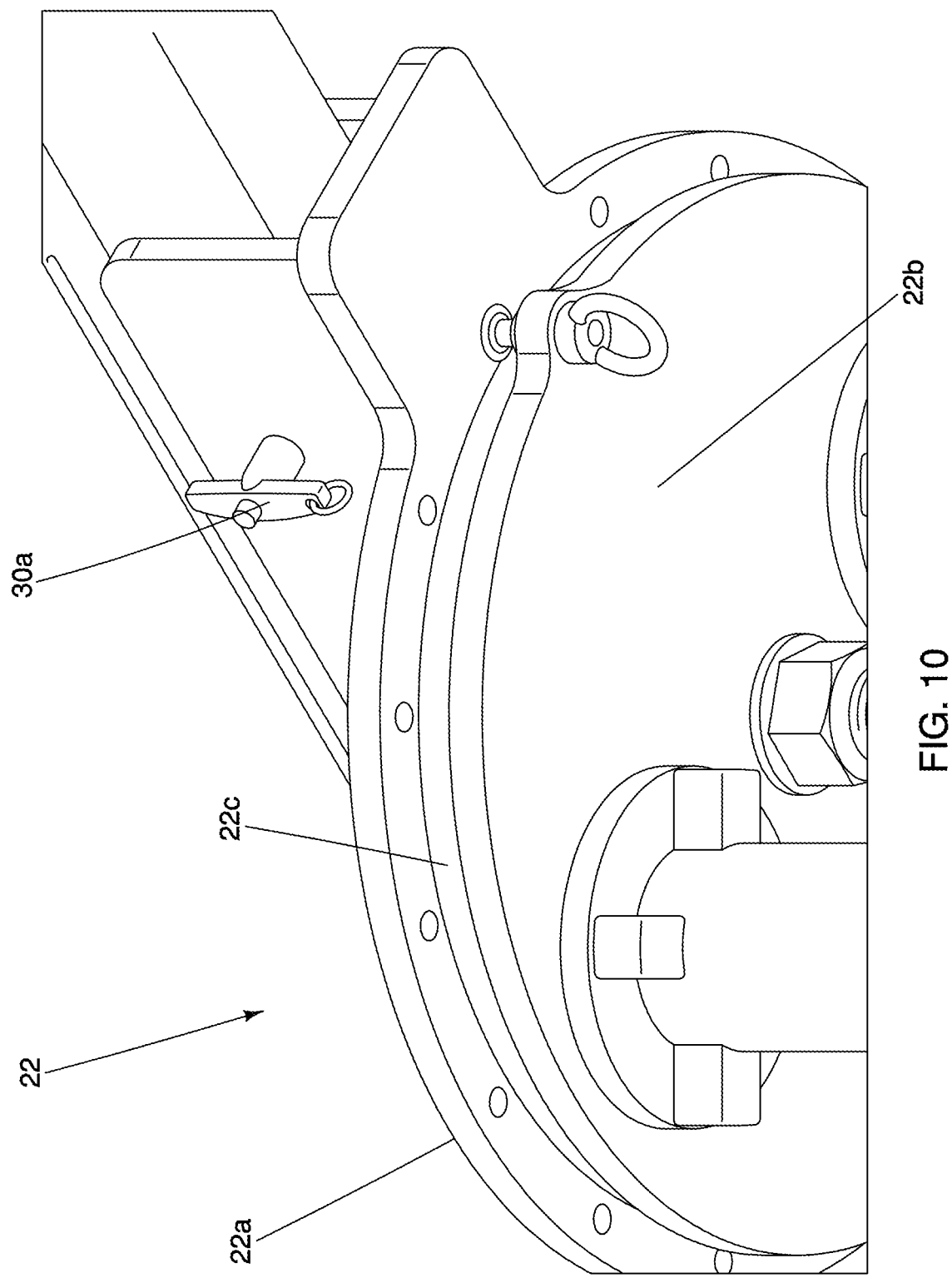
FIG. 10 is a partially cut-away enlarged bottom perspective view of the swivel plate and mounting bracket of the electrically insulated boom mountable temporary conductor guard structure of FIG. 8.
Figure 11A:
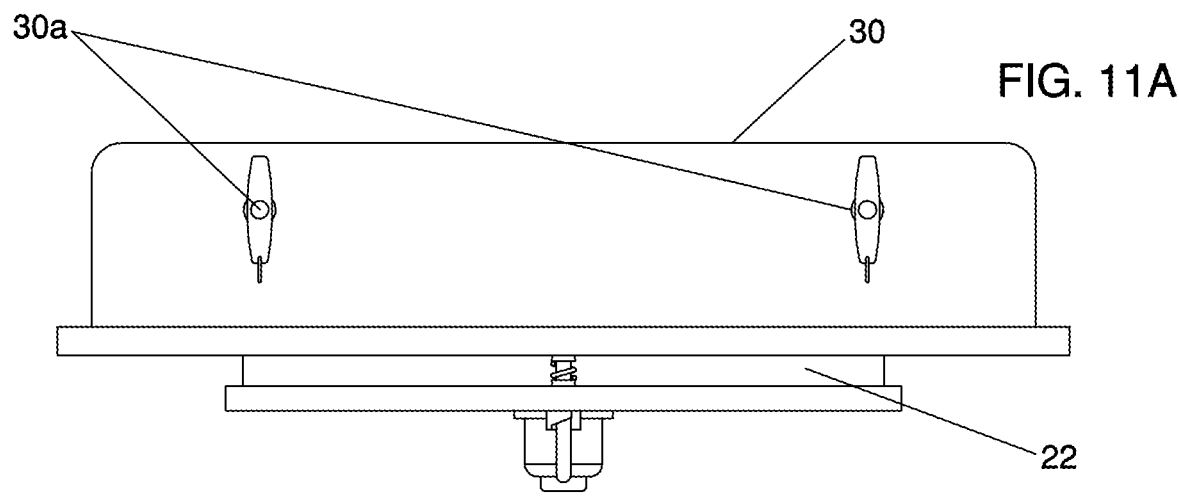
FIG. 11A is a side elevation view of the swivel plate and mounting bracket of the electrically insulated boom mountable temporary conductor guard structure of FIG. 8.
Figure 11B:
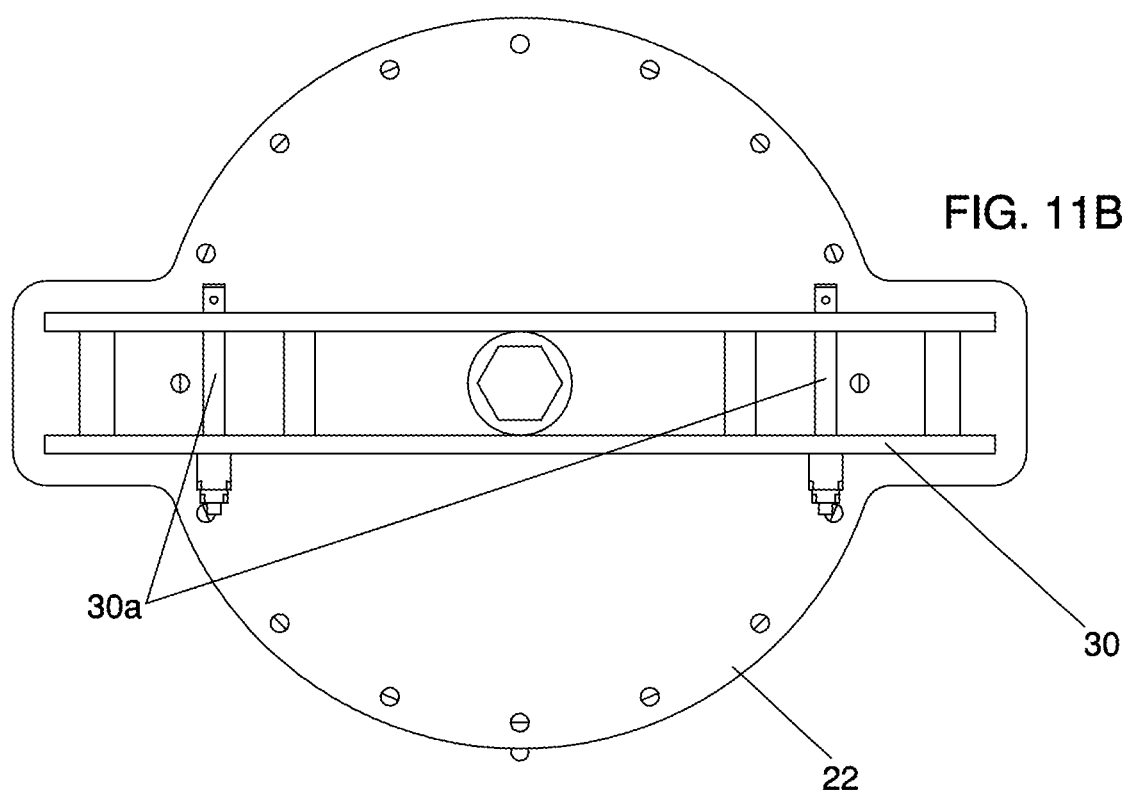
FIG. 11B is a top plan view of the swivel plate and mounting bracket of the electrically insulated boom mountable temporary conductor guard structure of FIG. 8.
Figure 11C:
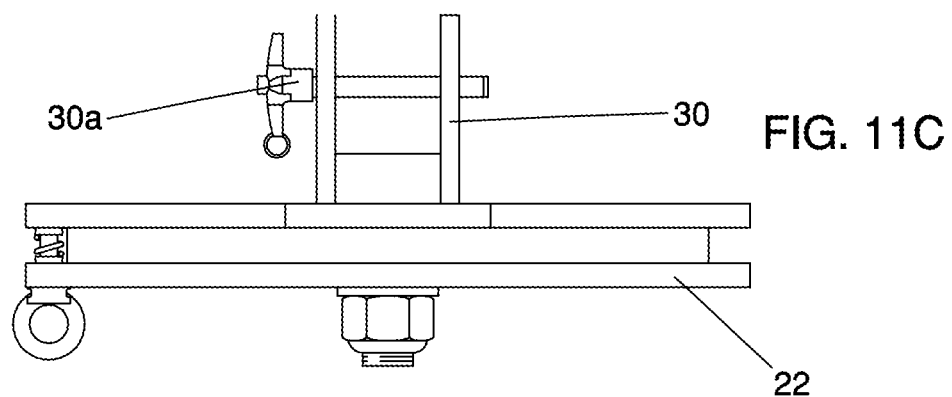
FIG. 11C is an end elevation view of the swivel plate and mounting bracket of the electrically insulated boom mountable temporary conductor guard structure of FIG. 8.

With reference to FIG. 10, in one embodiment the swivel 22 comprises an upper and lower swivel plate 22a and 22b sandwiching a bushing 22c. The bushing can be made of Nylatron, which applicant believes is a commercially available material made of a molybdenum disulphide-filled Nylon™, wherein Nylon™ refers to a family of synthetic polymers, based on aliphatic or semi-aromatic polyamides. Other materials or roller bearings may also be used for the bushing as would be known to one skilled in the art.

In a preferred embodiment, the conductor guard structure 2 has at least one, and preferably at least two station class electrical insulators 24 mounted to, so as to extend vertically between, the U-shaped frame 14 and platform 8a on base 8. Base 8 is mounted on the free or distal end of crane or truck boom 4, for example by means of a boom adaptor. More particularly, insulators 24 are, at their lower ends, mounted on platform 8a or insulator base 36 and at their upper ends mounted to swivel 22. Swivel 22 is mounted under and to beam 16, centered between the stub arms 18. Swivel 22 may be releasably or fixedly mounted under beam 16. Insulators 24 electrically isolate electrically insulated boom mountable temporary conductor guard structure 2 from crane or truck boom 4. Since rollers 20a and 20b are electrically conductive, the insulators 24 provide the sole electrical isolation between conductor guard structure 2 and crane or truck boom 4. In the energized stringing environment, the insulators 24 serve to eliminate the formation of a second ground point should the payout tensioning or pulling equipment fail causing the conductors to drop, or the conductors 100 otherwise sag down too low. This in turn eliminates the risk of creating a circulating current.

The use of electrical insulators between the electrically insulated boom mountable temporary conductor guard structure 2 and the crane or truck boom 4 electrically insulates and isolates the crane or boom truck from the conductor. The U-shaped frame 14 is thus electrically insulated from the crane or boom truck 6 which is critical when stringing conductors 100 in energized conditions and inhibiting the dangerous hazard of electrical current traveling down the crane or truck boom 4. This provides increased safety to personnel, public and equipment.

Figure 7:
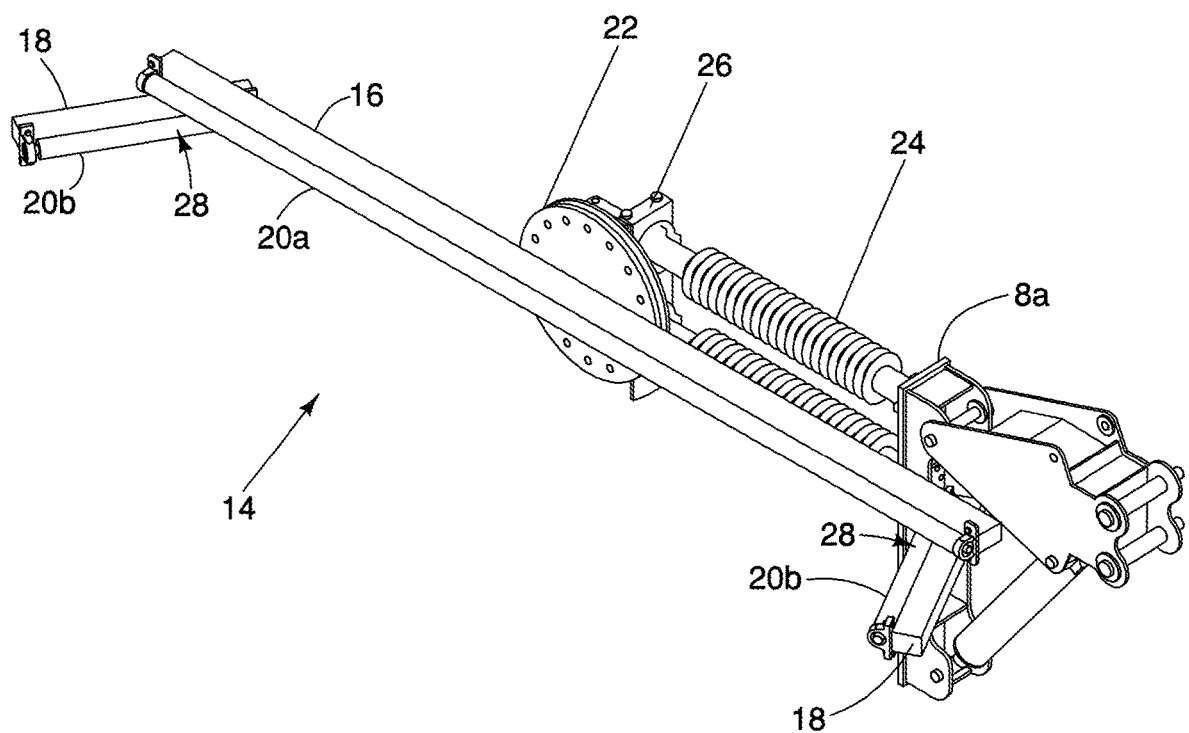
FIG. 7 is perspective view of the electrically insulated boom mountable temporary conductor guard structure of FIG. 2C, in a storage and transport position.
Figure 8:
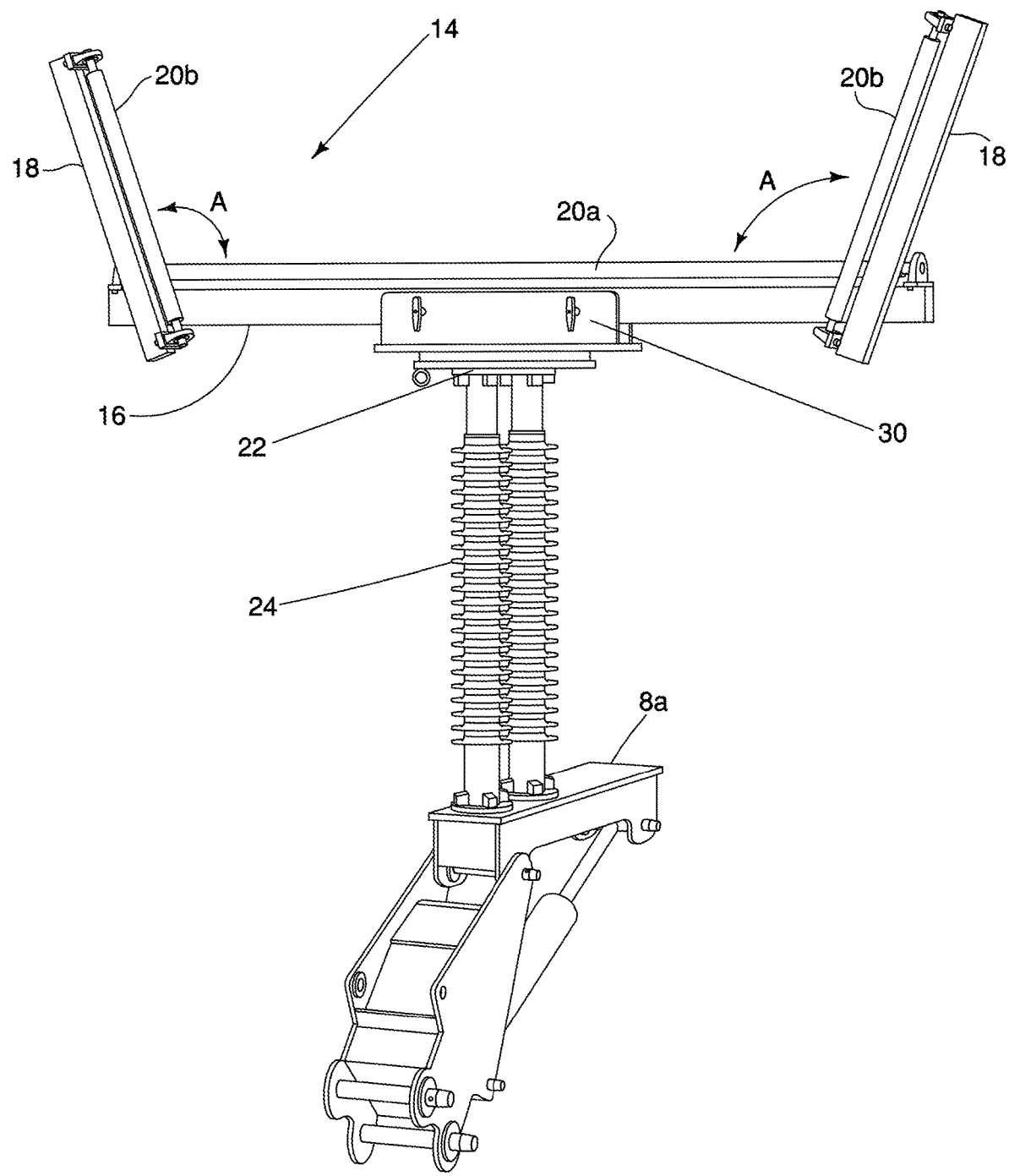
FIG. 8 is a front perspective view of the second embodiment of an electrically insulated boom mountable temporary conductor guard structure of FIG. 2A.

With reference to FIG. 2A through FIG. 2D, and 4 through 7, in one embodiment the electrically insulated boom mountable temporary conductor guard structure 2 may, as mentioned above, advantageously fold against the insulators 24 for storage and transport. A pivot connection 26 may thus be provided between the insulators 24 and the swivel 22 to allow pivoting of the U-shaped frame 14 and swivel 22 relative a longitudinal axis of the insulators 24 from an in use position as illustrated in FIG. 2A to FIG. 2D and FIG. 6 to a storage and transport position as illustrated in FIG. 4, FIG. 5 and FIG. 7. In this way, the swivel 22 and U-shaped frame 14 can be pivoted such that swivel 22 is relatively flush so as to be substantially parallel to and along a longitudinal axis of the insulators 24. The swivel 22 can also be rotated to rotate frame 14 such that beam 16 is also parallel to a longitudinal axis of the insulators 24.

Figure 9:
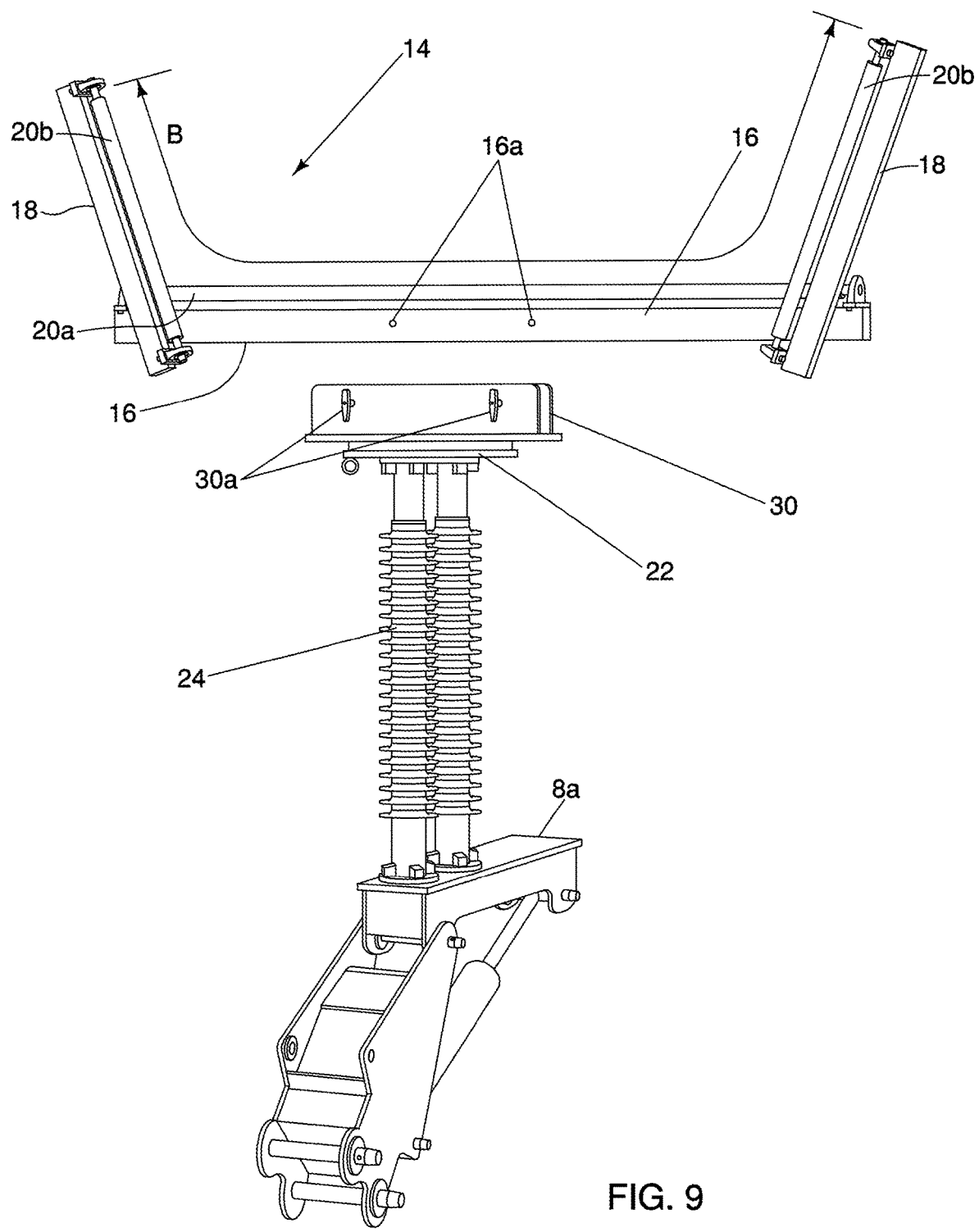
FIG. 9 is a partially exploded perspective view of the electrically insulated boom mountable temporary conductor guard structure of FIG. 8 showing the frame removed from the swivel plate.

In a further embodiment, as illustrated in FIG. 2A, FIG. 2B, and FIG. 8 to FIG. 11, the U-shaped frame 14 is removably mounted to the swivel 22 by means of a channel-shaped mounting bracket 30. As seen in FIG. 9, elongate beam 16 is removably affixable to the mounting bracket 30, for example by the pins illustrated, such that the U-shaped frame 14 can be removed from the rest of the conductor guard structure 2 for transport, storage or for replacement of the U-shaped frame 14 with another U-shaped frame 14 of different dimensions, as may be required based on conductor stringing conditions.

In the embodiment of FIG. 9, beam 16 may have one or more holes 16a formed therein through which one or more bolts, rods, bracket pins or other elongate members 30a of the mounting bracket 30 can pass to releasably mount the U-shaped frame 14 to the mounting bracket 30, and hence to the swivel 22.

In a further embodiment, the stub arms 18 can be rotated about their hinged or pinned connections (not shown) at elbows 28 such that the stub arms 18 are flush along beam 16 for storage and transportation.

Figure 1C:
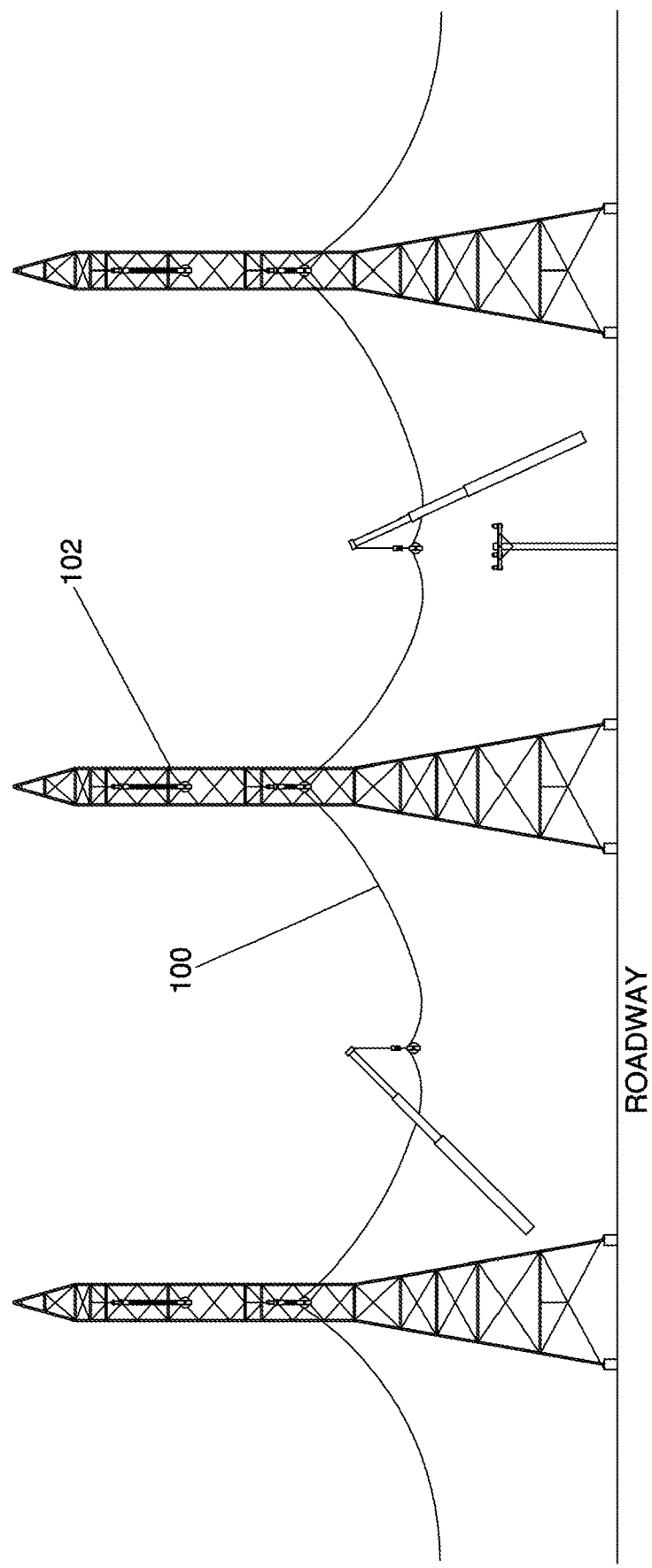
FIG. 1C is an elevation view of a stringing traveler suspended from a crane or truck boom winch line holding the conductor up.
Figure 12:
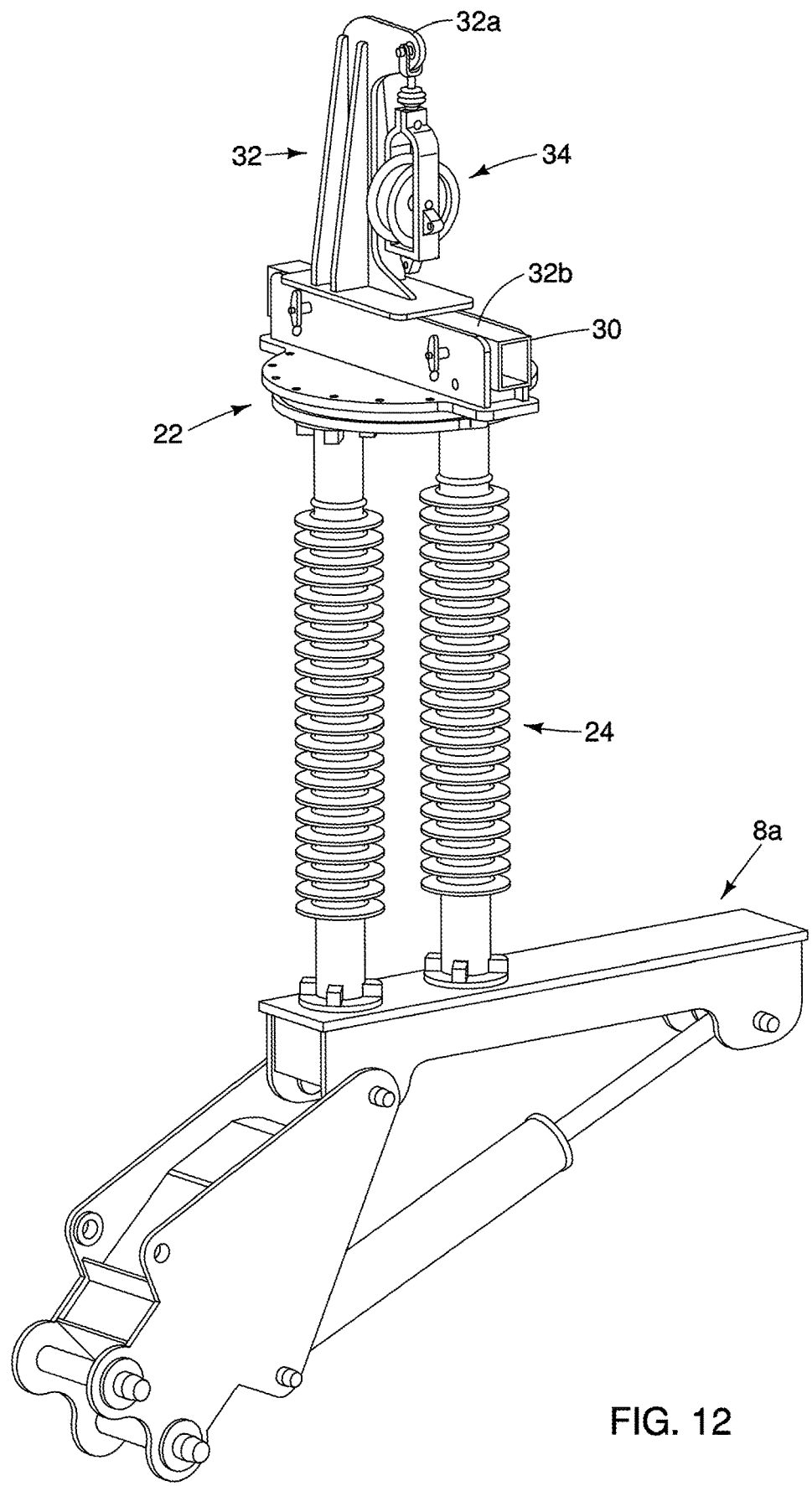
FIG. 12 is a perspective view of the electrically insulated boom mountable temporary conductor guard structure of FIG. 8 with the frame having been removed from the swivel plate and substituted with a removable stringing traveler on an adaptor support.
Figure 13:
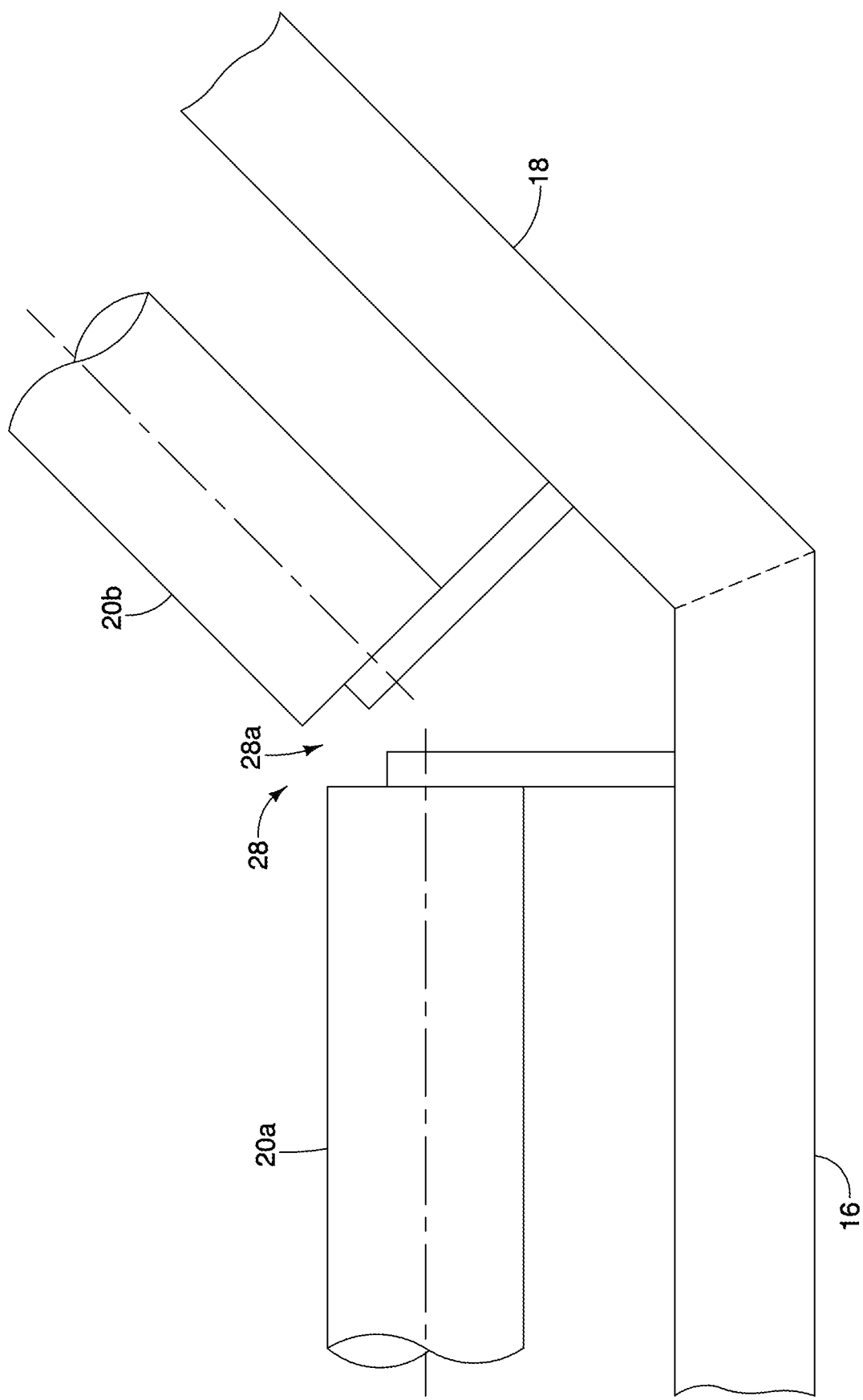
FIG. 13 is, in elevation view, a partially cutaway, enlarged view of a portion of the embodiment of the electrically insulated boom mountable temporary conductor guard structure of FIG. 14A.

In a further embodiment seen in FIG. 12, elongate beam 16 may be removed from the mounting bracket 30 and an adapter 32 supporting a stringing traveler 34 may be substituted if required to keep the conductor 100 up at a fixed position and height as is sometimes required in stringing situations in tight spaces. Another advantage of using a stringing traveler 34 on an adaptor 32 so as to position the stringing traveler 34 closely adjacent, and closely under the cantilevered arm 32a suspending the stringing traveler approximately centered over the swivel 22 is to reduce swinging of the stringing traveler as compared for example to when the stringing traveler is suspended on a winch line from a crane or truck boom such as seen in FIG. 1C. Adaptor 32 mounts into mounting bracket 30 by the snug fit therein of base member 32b.

The use of mounting bracket 30 also provides for ease of removing a first U-shaped frame 14 of a conductor guard structure from mounting bracket 30 so as to replace it with a second U-shaped frame of a conductor guard structure having a beam 16 of a different length. In this fashion, the length of beams 16 may be changed to accommodate different stringing situations.

Returning now to the embodiment of FIG. 4 to FIG. 7; to shift the electrically insulated boom mountable temporary conductor guard structure 2 from an in-use position to a storage position for transportation, the boom 4 is first lowered to lower the conductor guard structure 2 to the crane or boom truck 6. The swivel 22 and U-shaped frame 14 are pivoted about pivot connection 26 to align the swivel 22 parallel with the longitudinal axes of the insulators 24, and the swivel 22 is rotated until beam 16 is parallel to the longitudinal axes of the insulators 24. Optionally, in embodiments which accommodate it, the stub arms 18 are rotated about their hinged connections at elbows 28 until the stub arms 18 are flush along beam 16. The reverse order of these steps are taken to erect the conductor guard structure 2 from its storage position to its in-use position.

In the case of the embodiment of FIG. 8 to FIG. 11, for travel or storage the U-shaped frame 14 is removed from swivel 22 by removal of the one or more bracket pins 30a to release beam 16 from the mounting bracket 30. This allows the U-shaped frame 14 to be stored for example on the crane or boom truck 6.

Conductor guard structure 2 is thus positionable and operative to capture and support dropped or sagging conductors 100 during stringing operations and provides ease of storage for transportation on the crane or boom truck 6.

In an alternative embodiment, not intended to be limiting, and as illustrated in FIG. 13 and FIG. 14, the lower ends of rollers 20b and the ends of roller 20a may be very closely adjacent having for example a small gap 28a between their adjacent ends in elbows 28. In the embodiment of FIG. 13, rollers 20b and stub arms 18 are coplanar with roller 20a and beam 16, so as to effectively seamlessly extend the inside perimeter roller surfaces around, and in-line, so as to protect the conductor within the interior perimeter of U-shaped frame 14.

FIG. 15 illustrates a further embodiment of an adjustable adapter for supporting the insulators and temporary guard structure according to the present disclosure. Instead of using the illustrated base 8a pivotally mounted on adapter 8 and angularly adjustable by hydraulic cylinder 10 as illustrated for example in FIG. 2D, a manually selectively and releasably lockable, angularly adjustable adapter is provided for mounting the insulators and electrically insulated boom mountable temporary conductor guard structures according to the present disclosure onto the end of a crane or truck boom. U-shaped frame 14 is mounted on insulators 24, which are mounted on insulator adapter 36, which is mounted on adapter base 38, which is mounted on crane boom adapter 40 (by pins 44), which is mounted on the end of the crane or truck boom (not shown in FIG. 15).

In particular, insulators 24 are mounted on base plate 36a of insulator adapter 36. Base plate 36a is mounted on a pair of parallel, spaced apart generally identical pivot plates 36b mounted orthogonally under base plate 36a as better seen in FIG. 17. Bolt holes 36c are provided in base plate 36a for mounting insulators 24. Pivot apertures 36d are positioned identically on both pivot plates 36b for supporting a pivot pin 42a journaled therethrough. Adapter base 38 has corresponding pivot apertures 38c in side plates 38a also for having pivot pin 42a journaled therethrough. Side plates 38a are parallel and held rigidly spaced apart by perpendicular plates 38b. Pivot pin 42a provides a rotation point for coupling insulator adapter 36 to adapter base 38 and a hinge constraining insulators 24 and U-shaped frame 14 to pivot about axis C. Axis C is parallel to and under plate 36a and perpendicular to the longitudinal axis of the crane or truck boom (not shown in FIG. 15) so that rotation of insulators 24 and U-shaped frame 14 about axis C is in a vertical plane containing the longitudinal axis of the crane or truck boom.

The angular orientation of plate 36a relative to adapter base 38 is selected and releasably locked into the desired orientation by pivoting insulator adapter 36 about pivot pin 42a so as to align a pair of orientation locking apertures 36e on pivot plates 36b on insulator adapter 36 with a pair of orientation locking apertures 38d on side plates 38a on adapter base 38, and sliding a locking pin 42b through aligned apertures 36e and 38d. To re-orient insulator adapter 36 relative to adapter base 38, locking pin 42b is removed, then insulator adapter 36 pivoted about pivot pin 42a until the desired re-oriented locking apertures 36e are aligned with the re-oriented locking apertures 38d, and locking pin 42b then reinserted through the locking apertures. Thus, in the examples illustrated in FIG. 17A to FIG. 17C, which are not intended to be limiting, insulator adapter 36 is shown pivoted relative to adapter base 38 to form crane or truck boom angles of 20 degrees, 45 degrees, and 80 degrees respectively as measured from horizontal.

Figure 17A:
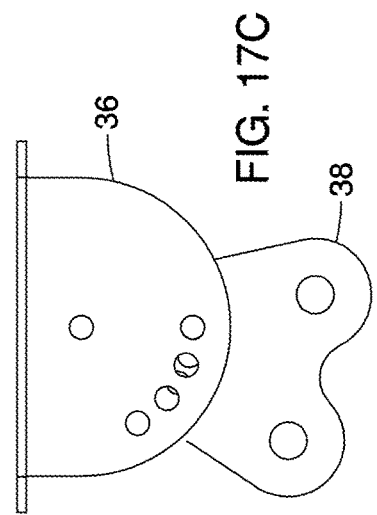
FIG. 17A is, in elevation view, the adapter base coupled to the insulator adapter so as to maintain the insulators vertical when the crane or truck boom is at a 20 degree angle.
Figure 17B:
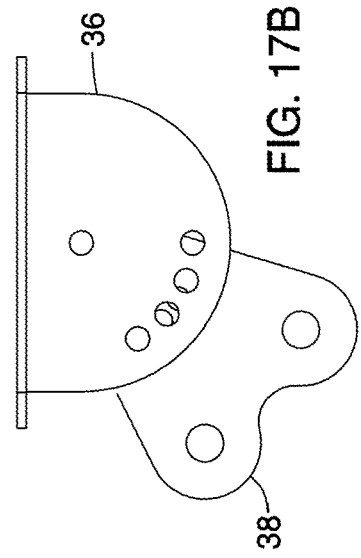
FIG. 17B is, in elevation view, the adapter base coupled to the insulator adapter so as to maintain the insulators vertical when the crane or truck boom is at a 45 degree angle.
Figure 17C:
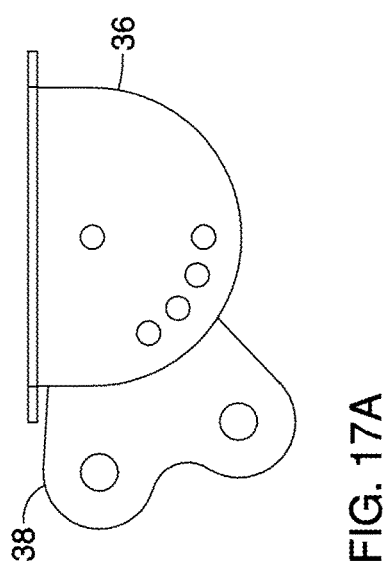
FIG. 17C is, in elevation view, the adapter base coupled to the insulator adapter so as to maintain the insulators vertical when the crane or truck boom is at a 80 degree angle.
Figure 17D:
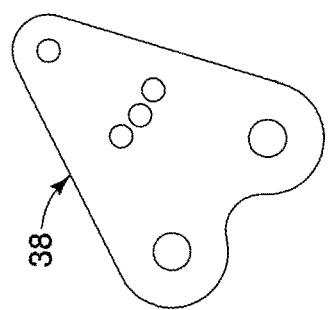
FIG. 17D is, in side elevation view, the adapter base oriented with the orientation locking apertures uppermost.
Figure 17E:
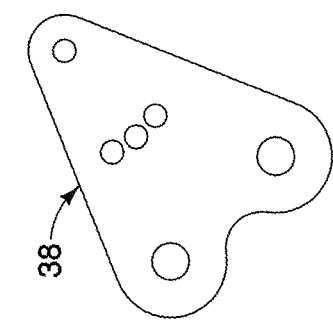
FIG. 17E is, in side elevation view, the adapter base oriented with the orientation locking apertures lowermost.

The range of angular orientations for a crane or truck boom from a low boom angle of 20 degrees to a high boom angle of 80 degrees in 5 degree increments is afforded by the orienting of locking apertures 36e with locking apertures 38d, and then fixing that orientation by insertion of locking pin 42b, may be extended by turning adapter base 38 over so that, to extend the range of the crane or truck boom angles while keeping the insulators vertical, and as seen in FIG. 17D, adapter base is oriented with the locking apertures 38d uppermost, and so that, to extend the range downwardly to decrease the crane or truck boom angle to its limits, and as seen in FIG. 17E, adapter base 38 is oriented with locking apertures 38d lowermost.

The previous description of the disclosed embodiments is provided to enable any person skilled in the art to make or use the present disclosure. Various modifications to those embodiments will be readily apparent to those skilled in the art, and the generic principles defined herein may be applied to other embodiments without departing from the spirit or scope of the disclosure. Thus, the present disclosure is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The invention claimed is:

1. An electrically insulated temporary conductor guard structure to capture energized conductors as they sag or drop during stringing operations, wherein the conductor guard structure is mountable to a distal end of a crane or truck boom and comprises:

a) at least one elongate electrical insulator adapted to be mounted to the distal end of the crane or boom at one end thereof, wherein, when the conductor guard structure is an operative orientation, the at least one electrical insulator extends vertically from the distal end of the crane or truck boom;

b) a rigid U-shaped frame adapted to be mounted to a second opposite end of the at least one electrical insulator, wherein the U-shaped frame includes an elongate horizontal beam having a pair of stub arms extending out of co-linearity with the beam and from opposite ends of the beam, and wherein, in the operative orientation of the conductor guard structure, the beam is perpendicular relative to the at least one electrical insulator and the pair of stub arms extend upwardly from the opposite ends of the beam forming an included angle with the beam wherein each of the pair of stub arms is mounted to the beam so that the included angle is at least 90 degrees to capture the energized conductors upon their sagging or dropping, and the pair of stub arms and the beam define an upper interior perimeter extending along and on upper surfaces of the length of the beam and the length of each of the stub arms of the pair of stub arms; and c) elongate, electrically conductive rollers rotatably mounted, adjacent and parallel to each of the stub arms of the pair of stub arms and the beam so as to form an electrically conductive rolling surface around the upper interior perimeter extending along the lengths of the beam and the stub arms, wherein the electrically conductive rollers have corresponding axes of rotation which are also adjacent to and parallel to each of the stub arms and the beam, and wherein, in the operative orientation of the conductor guard structure, as the sagged or dropped energized conductors are being supported on the electrically conductive rolling surface, a charging current on the sagged or dropped energized conductors is conducted by the electrically conductive rollers to the U-shaped frame to prevent burning or melting of the electrically conductive rollers and the charging current is prevented from reaching the distal end of the crane or truck boom as the U-shaped frame is electrically isolated from the distal end of the crane or truck boom by the at least one insulator.

2. The conductor guard structure of claim 1, wherein the electrically conductive rollers have exterior surfaces and wherein at least the exterior surfaces of the electrically conductive rollers are electrically conductive.

3. The conductor guard structure of claim 2, wherein the electrically conductive rollers are selected from the group consisting of aluminum rollers, steel rollers, electrically conductive composite rollers.

4. The conductor guard structure of claim 1, wherein, in the operative orientation of the conductor guard structure, the U-shaped frame is adapted to be selectively rotatable about a first axis of rotation so as to be perpendicular relative to the at least one electrical insulator and the energized conductors.

5. The conductor guard structure of claim 4 further comprising a selectively rotatable swivel, mounted under the U-shaped frame, for rotatably mounting the U-shaped frame to the second opposite end of the at least one electrical insulator, whereby the U-shaped frame is said selectively rotatable about the first axis of rotation.

6. The conductor guard structure of claim 5 further comprising a mounting bracket mounted to the swivel, and wherein the beam is removably mountable to the swivel by the mounting bracket.

7. The conductor guard structure of claim 5, wherein the at least one electrical insulator is mounted to an underside of the swivel.

8. The conductor guard structure of claim 7, wherein the at least one electrical insulator includes a pair of electrical insulators, and wherein, in the operative orientation of the conductor guard structure, the pair of electrical insulators extend between the distal end of the crane or truck boom and the underside of the swivel.

9. The conductor guard structure of claim 5, wherein the U-shaped frame and the swivel are further pivotable about a second axis of rotation, orthogonal to the first axis of rotation, for pivoting the conductor guard structure from the operative orientation to a storage-for-travel orientation, wherein the beam is positionable so as to lie parallel to the at least one electrical insulator.

10. The conductor guard structure of claim 9 further comprising a pivot connector, located between the swivel and the second opposite end of the at least one electrical insulator, for the pivoting of the U-shaped frame about the second axis of rotation relative to the at least one electrical insulator.

11. The conductor guard structure of claim 9, wherein in the storage-for-travel orientation, the stub arms are each rotatable about a corresponding pair of pivot connections on the beam such that the stub arms are rotatable so as to lie parallel to the beam.

12. The conductor guard structure of claim 1, wherein the beam has a beam length, and wherein each of the stub arms of the pair of stub arms has a stub arm length, and wherein the stub arm length is no greater than one half of the beam length.

13. The conductor guard structure of claim 12, wherein the length of each of the stub arms is adjustable by a length adjustment means selected from the group consisting of telescoping stub arms, modular stub arms, wherein the modular stub arms include stub arm sections which are connectable lengthwise to one another.

14. The conductor guard structure of claim 1, wherein the included angle is in the range of 100 to 140 degrees.

15. The conductor guard structure of claim 14, wherein each of the pair of stub arms are rotatably mounted to the beam and selectively adjustable so as to selectively adjust the included angle.

16. The conductor guard structure of claim 15, wherein the stub arms are rotatably mounted on the beam by a pivot connection between the stub arms and the beam.

17. The conductor guard structure of claim 16, wherein the pivot connection includes a releasable lock to lock the stub arms at a desired included angle.

18. The conductor guard structure of claim 1, wherein the beam has a first length and each of the stub arms has a second length, and wherein the first length is at least twice as long as the second length.

19. The conductor guard structure of claim 1, wherein the beam has a first length and each of the stub arms has a second length, and wherein the first length is at least three times as long as the second length.

20. The conductor guard structure of claim 1, wherein the beam has a first length and each of the stub arms has a second length, and wherein the first length is at least four times as long as the second length.

21. A method of catching and supporting a high voltage energized conductor using the conductor guard structure of claim 1, the method comprising the steps of:
   a) positioning the conductor guard structure of claim 1 below the location of, and perpendicular to, the energized conductor being strung;
   b) upon sagging or dropping of the energized conductor as the energized conductor is being strung, catching and supporting the energized conductor on the electrically conductive rollers;

c) conducting a charging current on the sagged or dropped energized conductor to the U-shaped frame thereby preventing the burning or melting of the electrically conductive rollers; and d) preventing the charging current from reaching the distal end of the crane or truck boom and electrically isolating the U-shaped frame from the distal end of the crane or truck boom using the at least one insulator.

22. A method of deploying the conductor guard structure of claim 1, from the operative orientation to a storage-for-travel orientation, the method comprising the steps of:
a) lowering the crane or truck boom to lower the conductor guard structure from a first height proximal the energized conductors to a second height proximal the crane or boom truck;
b) pivoting the U-shaped frame and a swivel to align a surface of the swivel with a longitudinal axis of the at least one electrical insulator; and
c) rotating the swivel until the beam is parallel to the longitudinal axis of the at least one electrical insulator.

23. The method of claim 22 further comprising the step of:
a) rotating the stub arms until the stub arms lie parallel to the beam.

24. The conductor guard structure of claim 1, wherein the beam and its corresponding roller lie in a first plane, and wherein the stub arms and their corresponding rollers lie in a second plane, and wherein the first and second planes are parallel and adjacent.

25. The conductor guard structure of claim 24, wherein the roller on the beam has a first roller length, and wherein each of the rollers on the stub arms have a second roller length, and wherein each of the stub arms are coupled to the beam so that the rollers on the stub arms overlap so as to be alongside the roller on the beam so as to form the electrically conductive rolling surface.

26. The conductor guard structure of claim 25, wherein the sum of the first and second roller lengths is greater than a length of the electrically conductive rolling surface.

27. The conductor guard structure of claim 1, wherein the beam and its corresponding roller, and the stub arms and their corresponding rollers, all lie in a common plane.

28. The conductor guard structure of claim 1, wherein the electrically conductive rolling surface is a continuous electrically conductive rolling surface.

29. The conductor guard structure of claim 1, wherein the electrically conductive rolling surface is a non-continuous electrically conductive rolling surface having gaps in the electrically conductive rolling surface between the ends of the roller mounted on the beam and the corresponding ends of the rollers mounted on the stub arms, and wherein the gaps are less than conductor diameters of the energized conductors.

30. An electrically insulated temporary conductor guard structure to capture energized conductors as they sag or drop during stringing operations, wherein the conductor guard structure is mountable to a distal end of a crane or truck boom and comprises:
a) at least one elongate electrical insulator adapted to be mounted to the distal end of the crane or boom at one end thereof, wherein, when the conductor guard structure is an operative orientation, the at least one electrical insulator extends vertically from the distal end of the crane or truck boom;
b) a rigid U-shaped frame adapted to be mounted to a second opposite end of the at least one electrical insulator, wherein the U-shaped frame includes an elongate horizontal beam having a pair of stub arms extending out of co-linearity with the beam and from opposite ends of the beam, and wherein, in the operative orientation of the conductor guard structure, the beam is perpendicular relative to the at least one electrical insulator and the pair of stub arms extend upwardly from the opposite ends of the beam forming an included angle with the beam wherein each of the pair of stub arms is mounted to the beam so that the included angle is at least 90 degrees to capture the energized conductors upon their sagging or dropping, and the pair of stub arms and the beam define an upper interior perimeter extending along and on upper surfaces of the length of the beam and the length of each of the stub arms of the pair of stub arms; and
c) elongate, electrically conductive rollers rotatably mounted, adjacent and parallel to each of the stub arms of the pair of stub arms and the beam so as to form an electrically conductive rolling surface around the upper interior perimeter extending along the lengths of the beam and the stub arms, wherein the electrically conductive rollers have corresponding axes of rotation which are also adjacent to and parallel to each of the stub arms and the beam, and wherein, in the operative orientation of the conductor guard structure, as the sagged or dropped energized conductors are being supported on the electrically conductive rolling surface, a charging current on the sagged or dropped energized conductors is conducted by the electrically conductive rollers to the U-shaped frame to prevent burning or melting of the electrically conductive rollers and the charging current is prevented from reaching the distal end of the crane or truck boom as the U-shaped frame is electrically isolated from the distal end of the crane or truck boom by the at least one insulator,
wherein a length of each of the stub arms is adjustable by a length adjustment means selected from the group consisting of telescoping stub arms and modular stub arms, wherein the modular stub arms include stub arm sections that are connectable lengthwise to one another.

* * * * *